(12) United States Patent
Hill et al.

(10) Patent No.: US 12,387,861 B2
(45) Date of Patent: *Aug. 12, 2025

(54) MAGNETIC MATERIALS WITH HIGH CURIE TEMPERATURES AND DIELECTRIC CONSTANTS

(71) Applicant: Skyworks Solutions, Inc., Irvine, CA (US)

(72) Inventors: Michael David Hill, Emmitsburg, MD (US); David Bowie Cruickshank, Rockville, MD (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,779

(22) Filed: Oct. 19, 2023

(65) Prior Publication Data

US 2024/0120136 A1    Apr. 11, 2024

Related U.S. Application Data

(63) Continuation of application No. 17/865,188, filed on Jul. 14, 2022, now Pat. No. 11,830,647, which is a
(Continued)

(51) Int. Cl.
*H01F 1/34* (2006.01)
*C01G 49/00* (2006.01)
*H01P 1/36* (2006.01)

(52) U.S. Cl.
CPC ......... *H01F 1/344* (2013.01); *C01G 49/0054* (2013.01); *C01P 2002/30* (2013.01);
(Continued)

(58) Field of Classification Search
CPC ..... H01F 1/344; H01F 1/346; C01G 49/0054; C01P 2002/30; C01P 2002/50;
(Continued)

(56) References Cited

U.S. PATENT DOCUMENTS 3,838,450 A    9/1974    Bongers et al.
5,556,818 A    9/1996    Kohler et al.
(Continued)

FOREIGN PATENT DOCUMENTS

CN    106242547    12/2016
JP    2016-196407    11/2016
(Continued)

OTHER PUBLICATIONS

David B. Cruickshank, "Microwave Materials for Wireless Application" 2011, 211 pages.
(Continued)

*Primary Examiner* — Andrew J. Oyer
(74) *Attorney, Agent, or Firm* — Knobbe Martens Olson & Bear LLP

(57) ABSTRACT

Disclosed herein are ceramic materials, such as bismuth substituted garnets, which can have high curie temperatures and high dielectric constants. In certain implementations, indium can be incorporated into the ceramic to improve certain properties and to avoid calcium compensation. The ceramic materials disclosed herein can be particular advantageous for below resonance applications.

19 Claims, 16 Drawing Sheets

Related U.S. Application Data continuation of application No. 16/513,309, filed on Jul. 16, 2019, now Pat. No. 11,417,450.

(60) Provisional application No. 62/699,857, filed on Jul. 18, 2018.

(52) U.S. Cl.
CPC ...... *C01P 2002/50* (2013.01); *C01P 2002/77* (2013.01); *C01P 2006/32* (2013.01); *C01P 2006/40* (2013.01); *C01P 2006/42* (2013.01); *H01P 1/36* (2013.01)

(58) Field of Classification Search
CPC .............. C01P 2002/77; C01P 2006/32; C01P 2006/40; C01P 2006/42; C01P 2004/61; C01P 2006/10; H01P 1/36; C04B 2235/3224; C04B 2235/3244; C04B 2235/3286; C04B 2235/764; C04B 35/2675; C04B 2235/3208; C04B 2235/3225; C04B 2235/3239; C04B 2235/3298
See application file for complete search history.

(56) References Cited

U.S. PATENT DOCUMENTS

| | | |
|---|---|---|
| 6,243,254 B1 | 6/2001 | Wada et al. |
| 8,696,925 B2 | 4/2014 | Cruickshank et al. |
| 9,263,175 B2 * | 2/2016 | Cruickshank ........... H01P 1/387 |
| 9,527,776 B2 | 12/2016 | Cruickshank et al. |
| 9,771,304 B2 | 9/2017 | Cruickshank et al. |
| 10,181,632 B2 | 1/2019 | Cruickshank et al. |
| 10,230,146 B2 | 3/2019 | Cruickshank et al. |
| 10,773,972 B2 | 9/2020 | Cruickshank et al. |
| 11,373,788 B2 | 6/2022 | Hill et al. |
| 11,417,450 B2 | 8/2022 | Hill et al. |
| 2002/0039555 A1 | 4/2002 | Matsunaga et al. |
| 2005/0128023 A1 | 6/2005 | Takahashi et al. |
| 2006/0170513 A1 | 8/2006 | Mazzochette et al. |
| 2007/0211409 A1 | 9/2007 | Hara et al. |
| 2010/0328844 A1 | 12/2010 | Nishimura et al. |
| 2012/0133452 A1 | 5/2012 | Cruickshank et al. |
| 2013/0050041 A1 | 2/2013 | Cruickshank et al. |
| 2014/0021418 A1 | 1/2014 | Shiroki et al. |
| 2015/0171501 A1 | 6/2015 | Cruickshank et al. |
| 2016/0362341 A1 | 12/2016 | Cruickshank et al. |
| 2021/0087071 A1 | 3/2021 | Cruickshank et al. |
| 2022/0324722 A1 | 10/2022 | Cruickshank et al. |
| 2023/0117745 A1 | 4/2023 | Hill et al. |

FOREIGN PATENT DOCUMENTS

| | | |
|---|---|---|
| TW | 2013-02657 | 1/2013 |
| WO | WO 2018/013499 | 7/2018 |

OTHER PUBLICATIONS

International Search Report and Written Opinion for Application No. PCT/US2017/041418 dated Oct. 20, 2017.

International Search Report and Written Opinion for PCT/US2019/042052, dated Oct. 31, 2019, in 8 pages.

* cited by examiner

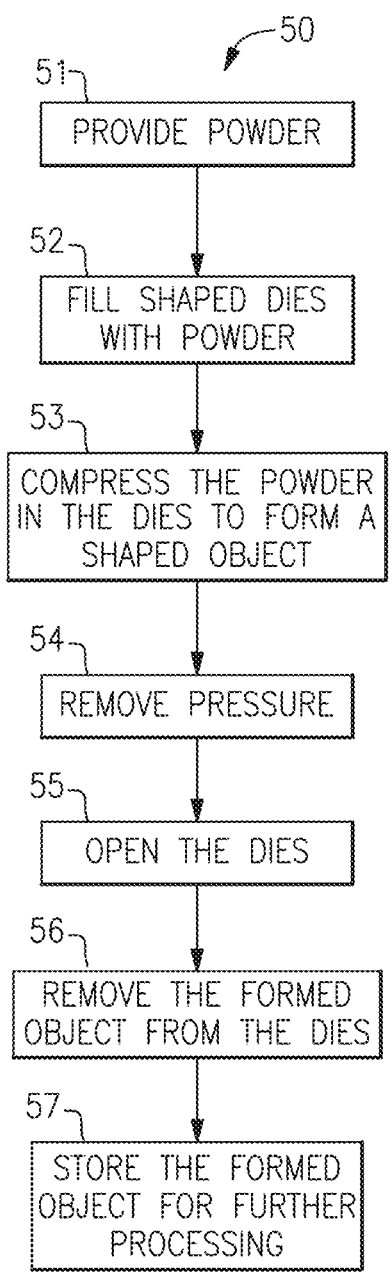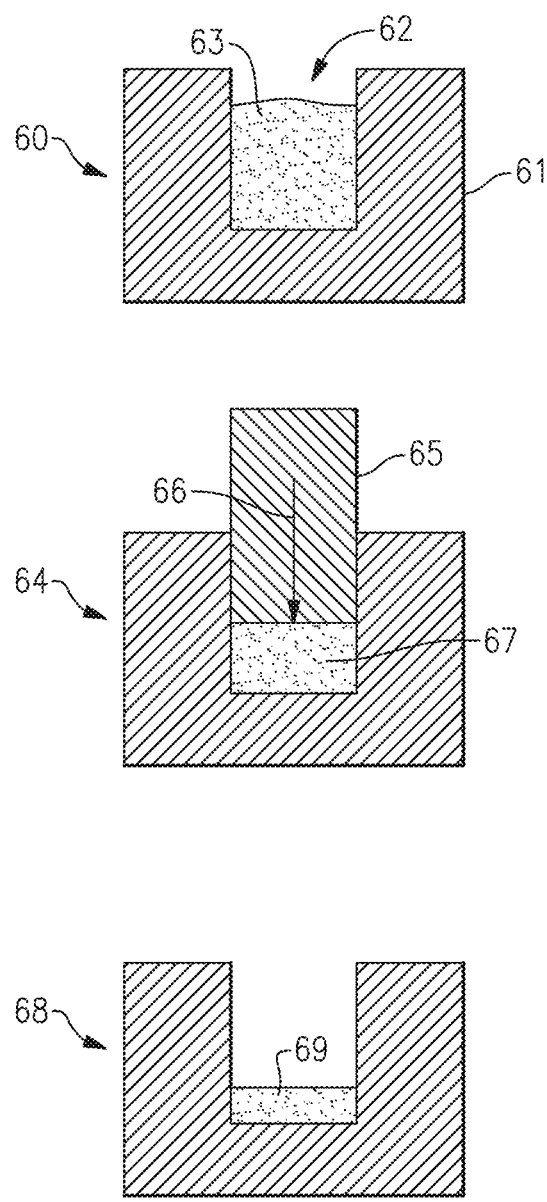
FIG. 11
FIG. 12

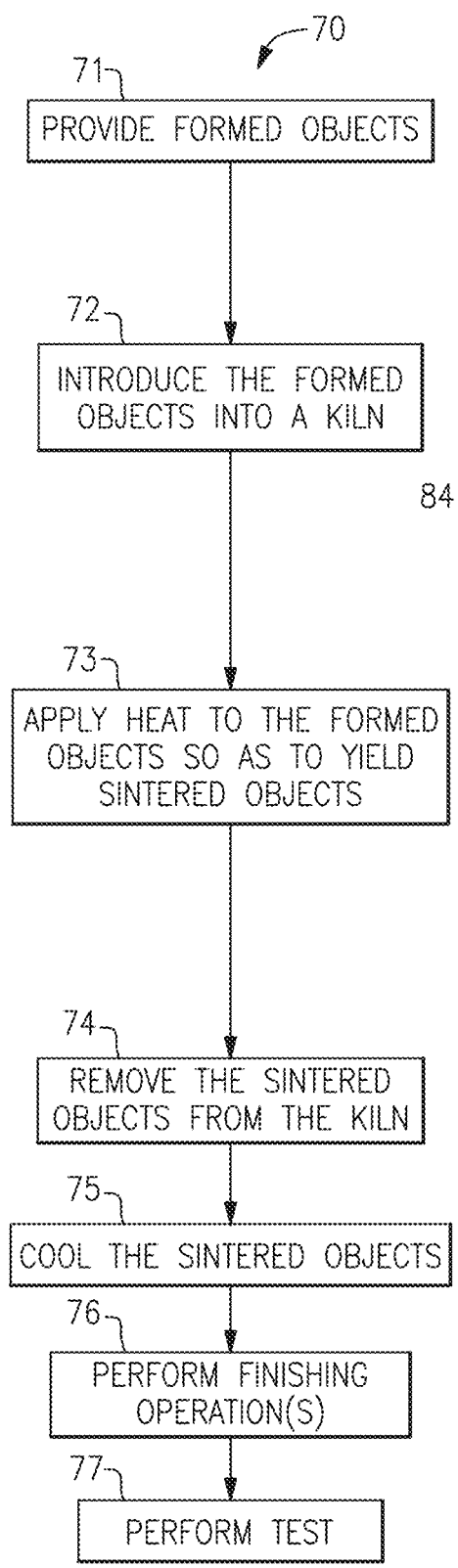

MAGNETIC MATERIALS WITH HIGH CURIE TEMPERATURES AND DIELECTRIC CONSTANTS

INCORPORATION BY REFERENCE TO ANY PRIORITY APPLICATIONS

This application is continuation of U.S. application Ser. No. 17/865,188, filed Jul. 14, 2022, which is a continuation of U.S. application Ser. No. 16/513,309, filed Jul. 16, 2019, which claims priority to U.S. App. No. 62/699,857, filed Jul. 18, 2018, the entirety of which is incorporated by reference herein.

BACKGROUND

Field

The present disclosure generally relates to garnets having advantageous properties for below resonance applications, such as high curie temperatures and high dielectric constants.

Description of the Related Art

Various crystalline materials with magnetic properties have been used as components in electronic devices such as cellular phones, biomedical devices, and RFID sensors. Garnets are crystalline materials with ferrimagnetic properties particularly useful in RF electronics operating in the lower frequency portions of the microwave region. Many microwave magnetic materials are derivatives of Yttrium Iron Garnet (YIG), a synthetic form of garnet widely used in various telecommunication devices largely because of its favorable magnetic properties such as narrow linewidth at its ferromagnetic resonance frequency. YIG is generally composed of yttrium, iron, and oxygen, and is possibly doped with one or more other rare earth metals such as lanthanides or scandium.

SUMMARY

Disclosed herein are embodiments of a ceramic material with low temperature sensitivity, the ceramic material having a composition of $Y_{1-x-2y}Bi_xCa_{2y}Fe_{1-z-y}In_zV_yO_{12}$ and having a dielectric constant of at least 25. In some embodiments, the dielectric constant can be at least 30.

Also disclosed herein are embodiments of a ceramic material with low temperature sensitivity, the ceramic material having a composition of $(Y$ or $Gd)_{1-x-2y}Bi_xCa_{2y}Fe_{1-z-y}In_zV_yO_{12}$ and having a dielectric constant of at least 25. In some embodiments, the dielectric constant can be at least 30.

In some embodiments, the ceramic material does not include aluminum. In some embodiments, in $0<x<1.75$, $0<y<0.8$, and $0<z<0.7$. In some embodiments, $1.4<x<1.6$, $0<y<0.8$, and $0.2<z<0.7$. In some embodiments, the ceramic material has a Curie temperature of at least 210. In some embodiments, the ceramic material has a Curie temperature of at least 220. In some embodiments, the ceramic material has a magnetization of at least 1000. In some embodiments, the ceramic material has a magnetization of at least 1200.

In some embodiments, the ceramic material has a composition including: $Bi_{1.4}Y_{0.66}Ca_{0.94}In_{0.4}V_{0.47}Fe_{4.13}O_{12}$; $Bi_{1.4}Y_{0.62}Ca_{0.98}In_{0.4}V_{0.49}Fe_{4.11}O_{12}$; $Bi_{1.4}Y_{0.58}Ca_{1.02}In_{0.4}V_{0.51}Fe_{4.09}O_{12}$; $Bi_{1.4}Y_{0.54}Ca_{1.06}In_{0.4}V_{0.53}Fe_{4.07}O_{12}$; $Bi_{1.4}Y_{0.50}Ca_{1.11}In_{0.4}V_{0.55}Fe_{4.05}O_{12}$; $Bi_{1.4}Y_{0.46}Ca_{1.14}In_{0.4}V_{0.57}Fe_{4.03}O_{12}$; $Bi_{1.4}Y_{0.42}Ca_{1.18}In_{0.4}V_{0.59}Fe_{4.01}O_{12}$; $Bi_{1.4}Y_{0.38}Ca_{1.22}In_{0.4}V_{0.61}Fe_{3.99}O_{12}$; or $Bi_{1.4}Y_{0.34}Ca1_{0.26}In_{0.4}V_{0.63}Fe_{3.97}O_{12}$.

Further disclosed herein are embodiments of a ceramic material with low temperature sensitivity, the ceramic material having a composition of $Y_{1-x-2y}Bi_xCa_{2y+a}Fe_{1-z-y-a}In_zV_yZr_aO_{12}$ and having a dielectric constant of at least 30.

Further disclosed herein are embodiments of a ceramic material with low temperature sensitivity, the ceramic material having a composition of $(Y$ or $Gd)_{1-x-2y}Bi_xCa_{2y+a}Fe_{1-z-y-a}In_zV_yZr_aO_{12}$ and having a dielectric constant of at least 30.

In some embodiments, the ceramic material does not include aluminum. In some embodiments, wherein $0<x<1.75$, $0<y<0.8$, and $0<z<0.7$. In some embodiments, $1.4<x<1.6$, $0<y<0.8$, and $0.2<z<0.7$. In some embodiments, the ceramic material has a Curie temperature of at least 210. In some embodiments, the ceramic material has a Curie temperature of at least 220. In some embodiments, the ceramic material has a magnetization of at least 1000. In some embodiments, the ceramic material has a magnetization of at least 1200.

Also disclosed herein are embodiments of an isolator including the ceramic material discussed herein.

Also disclosed herein are embodiments of a method of forming a synthetic garnet having temperature insensitivity, the method comprising incorporating bismuth, calcium, indium, and vanadium into a crystal structure of a yttrium iron garnet structure to achieve the composition $Y_{1-x-2y}Bi_xCa_{2y}Fe_{1-z-y}In_zV_yO_{12}$ having a dielectric constant of at least 30.

Also disclosed herein are embodiments of a method of forming a synthetic garnet having temperature insensitivity, the method comprising incorporating bismuth, calcium, indium, and vanadium into a crystal structure of a yttrium iron garnet structure to achieve the composition $(Y, Gd)_{1-x-2y}Bi_xCa_{2y}Fe_{1-z-y}In_zV_yO_{12}$ having a dielectric constant of at least 30.

BRIEF DESCRIPTION OF THE DRAWINGS

FIG. 11 shows a process that can be implemented to form a shaped object from powder material described herein.

FIG. 12 shows examples of various stages of the process of FIG. 11.

FIG. 13 shows a process that can be implemented to sinter formed objects such as those formed in the example of FIGS. 11 and 12.

FIG. 14 shows examples of various stages of the process of FIG. 13.

DETAILED DESCRIPTION

Disclosed herein are embodiments of synthetic garnets, such as temperature-insensitive synthetic garnets, and methods of manufacturing them. In particular, an excess amount of bismuth atoms can be incorporated into the garnet lattice structure in order to increase the overall dielectric constant of the material without experiencing deleterious effects to other magnetic or electrical aspects of the garnet. For example, bismuth substituted ferromagnetic garnets may show enhanced dielectric constants as a sintered ceramic, making them useful for miniaturizing isolators and circulators in commercial wireless infrastructure devices and base stations. Embodiments of the disclosed materials can be advantageously used in isolators and circulators, in particular for below resonance applications. Embodiments of the disclosed materials can have a high dielectric constant and high Curie temperature while limiting magnetization.

Previous solutions have involved the doping of the bismuth-based garnets with large amounts of aluminum, typically to modify the saturation magnetization. However, the incorporation of aluminum tends to depress the Curie temperatures of the materials, thus limiting the temperature range use. Accordingly, embodiments of the disclosed materials can be generally aluminum free (e.g., can contain no aluminum, can contain about 0% aluminum, or can contain only trace amounts of aluminum). This can allow the materials to have high Curie temperatures, making them more temperature insensitive, while also having high dielectric constants.

Figure 1:
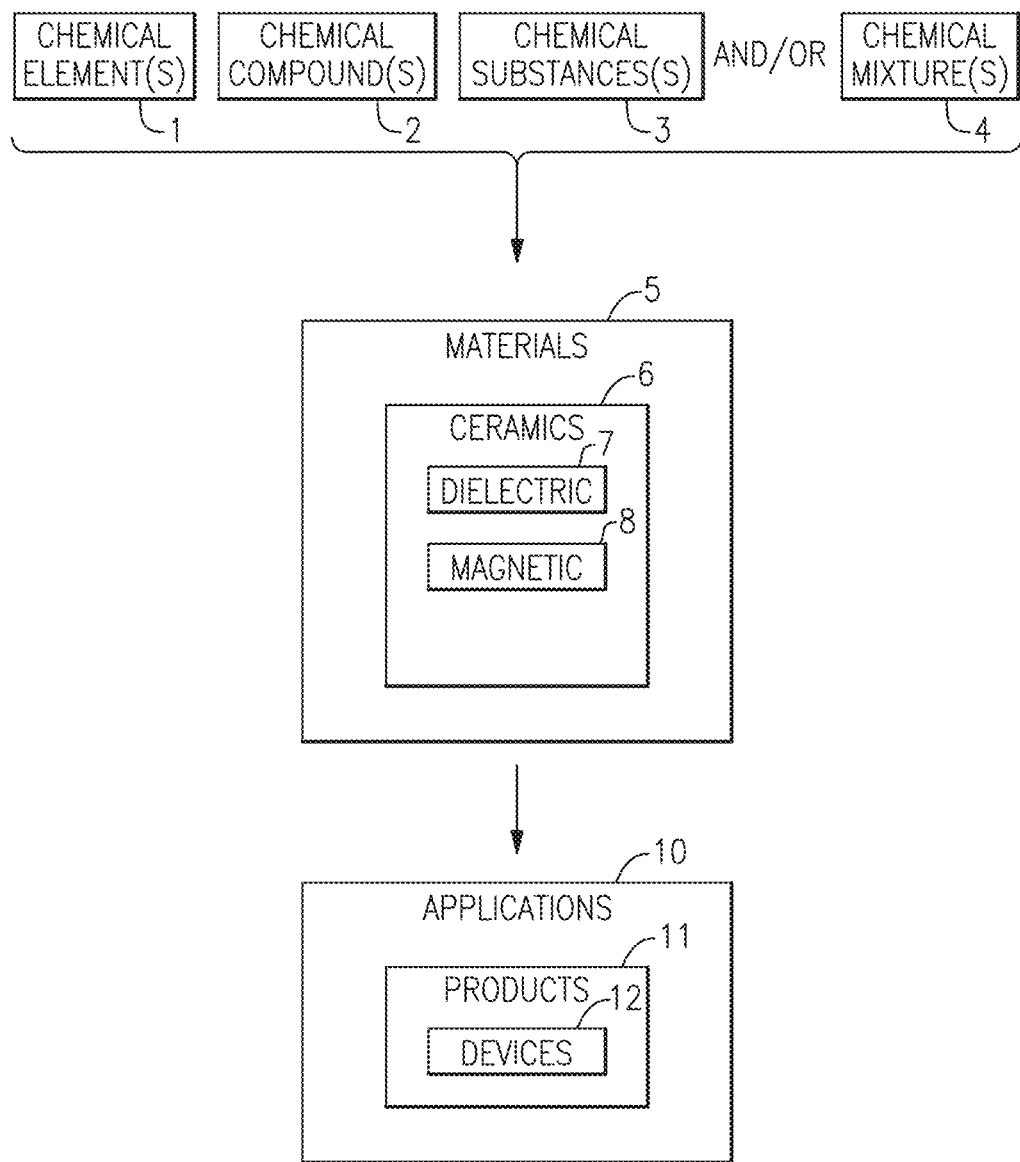
FIG. 1 schematically shows how materials having one or more features described herein can be designed, fabricated, and used.

FIG. 1 schematically shows how one or more chemical elements (block 1), chemical compounds (block 2), chemical substances (block 3) and/or chemical mixtures (block 4) can be processed to yield one or more materials (block 5) having one or more features described herein. In some embodiments, such materials can be formed into ceramic materials (block 6) configured to include a desirable dielectric property (block 7), a magnetic property (block 8) and/or an advanced material property (block 9).

In some embodiments, a material having one or more of the foregoing properties can be implemented in applications (block 10) such as radio-frequency (RF) application. Such applications can include implementations of one or more features as described herein in devices 12. In some applications, such devices can further be implemented in products 11. Examples of such devices and/or products are described herein.

Synthetic Garnets

Disclosed herein are methods of modifying synthetic garnet compositions, such as Yttrium Iron Garnet (YIG) or Gadolinium Iron Garnet (GIG), to increase the dielectric constant of the material. However, it will be understood that other synthetic garnets, such as yttrium aluminum garnet or gadolinium gallium garnet, can be used as well. Also disclosed herein are synthetic garnet materials having high dielectric constant, methods of producing the materials, and the devices and systems incorporating such materials.

Figure 2:
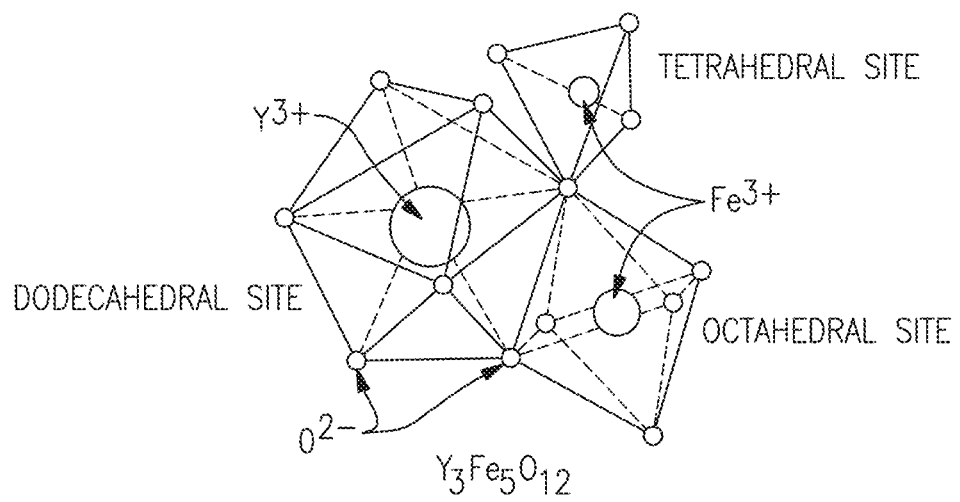
FIG. 2 depicts an yttrium based garnet crystal lattice structure.

Synthetic garnets typically have the formula unit of $A_3B_5O_{12}$, where A and B are trivalent metal ions. Yttrium Iron Garnet (YIG) is a synthetic garnet having the formula unit of $Y_3Fe_5O_{12}$, which includes Yttrium (Y) in the 3+ oxidation state and Iron (Fe) in the 3+ oxidation state. The crystal structure of a YIG formula unit is depicted in FIG. 2. As shown in FIG. 2, YIG has a dodecahedral site, an octahedral site, and a tetrahedral site. The Y ions occupy the dodecahedral site while the Fe ions occupy the octahedral and tetrahedral sites. Each YIG unit cell, which is cubic in crystal classifications, has eight of these formula units.

The modified synthetic garnet compositions, in some embodiments, comprise substituting some or all of the Yttrium (Y) in Yttrium Iron Garnets (YIG) with a combination of other ions such that the resulting material maintains desirable magnetic properties for microwave applications, for example high dielectric constants. There have been past attempts toward doping YIG with different ions to modify the material properties. Some of these attempts, such as Bismuth (Bi) doped YIG, are described in "Microwave Materials for Wireless Applications" by D. B. Cruickshank, which is hereby incorporated by reference in its entirety. However, in practice ions used as substitutes may not behave predictably because of, for example, spin canting induced by the magnetic ion itself or by the effect of non-magnetic ions on the environment adjacent magnetic ions, reducing the degree alignment. Thus, the resulting magnetic properties cannot be predicted. Additionally, the amount of substitution is limited in some cases. Beyond a certain limit, the ion will not enter its preferred lattice site and either remains on the outside in a second phase compound or leaks into another site. Additionally, ion size and crystallographic orientation preferences may compete at high substitution levels, or substituting ions are influenced by the ion size and coordination of ions on other sites. As such, the assumption that the net magnetic behavior is the sum of independent sub-lattices or single ion anisotropy may not always apply in predicting magnetic properties.

Considerations in selecting an effective substitution of rare earth metals in YIG for microwave magnetic applications include the optimization of the density, the magnetic resonance linewidth, the saturation magnetization, the Curie temperature, the dielectric constant of the material, and the dielectric loss tangent in the resulting modified crystal structure. Magnetic resonance is derived from spinning electrons, which when excited by an appropriate radio frequency (RF) will show resonance proportional to an applied magnetic field and the frequency. The width of the resonance peak is usually defined at the half power points and is referred to as the magnetic resonance linewidth. It is generally advantageous for the material to have a low linewidth because low linewidth manifests itself as low magnetic loss, which is required for all low insertion loss ferrite devices. The modified garnet compositions according to preferred embodiments of the present invention provide single crystal or polycrystalline materials with reduced Yttrium content and yet maintaining low linewidth and other desirable properties for microwave magnetic applications.

In some embodiments, a Yttrium based garnet is modified by substituting Bismuth ($Bi^{3+}$) for some of the Yttrium ($Y^{3+}$) on the dodecahedral sites of the garnet structure in combination with introducing one or more ions, such as divalent (+2), trivalent (+3), tetravalent (+4), pentavalent (+5) or hexavalent (+6) non-magnetic ions to the octahedral sites of the structure to replace at least some of the Iron ($Fe^{3+}$). In some embodiments, one or more high valency non-magnetic ions such as Zirconium ($Zr^{4+}$) or Niobium ($Nb^{5+}$) can be introduced to the octahedral sites. Similar approaches can be taken for Gadolinium based garnets.

In some embodiments, a Yttrium based garnet is modified by introducing one or more high valency ions with an oxidation state greater than 3+ to the octahedral or tetrahedral sites of the garnet structure in combination with substituting Calcium ($Ca^{3+}$) for Yttrium ($Y^{3+}$) in the dodecahedral site of the structure for charge compensation induced by the high valency ions, hence reducing the $Y^{3+}$ content. When non-trivalent ions are introduced, valency balance is maintained by introducing, for example, divalent Calcium ($Ca^{3+}$) to balance the non-trivalent ions. For example, for each 4+ ion introduced to the octahedral or tetrahedral sites, one $Y^{3+}$ ion can be substituted with a $Ca^{3+}$ ion. For each 5+ ion, two $Y^{3+}$ ions can be replaced by $Ca^{3+}$ ions. For each 6+ ion, three $Y^{3+}$ ions can be replaced by $Ca^{3+}$ ions. For each 6+ ion, three $Y^{3+}$ ions can be replaced by $Ca^{3+}$ ions. In one embodiment, one or more high valence ions selected from the group consisting of $Zr^{4+}$, $Sn^{4+}$, $Ti^{4+}$, $Nb^{5+}$, $Ta^{5+}$, $Sb^{5+}$, $W^{6+}$, and $Mo^{6+}$ is introduced to the octahedral or tetrahedral sites, and divalent Calcium ($Ca^{3+}$) is used to balance the charges, which in turn reduces $Y^{3+}$ content. Similar approaches can be taken for Gadolinium based garnets.

In some embodiments, a Yttrium based garnet is modified by introducing one or more high valency ions, such as Vanadium ($V^{5+}$), to the tetrahedral site of the garnet structure to substitute for $Fe^{3+}$ to further reduce the magnetic resonance linewidth of the resulting material. Without being bound by any theory, it is believed that the mechanism of ion substitution causes reduced magnetization of the tetrahedral site of the lattice, which results in higher net magnetization of the garnet, and by changing the magnetocrystalline environment of the ferric ions also reduces anisotropy and hence the ferromagnetic linewidth of the material. Similar approaches can be taken for Gadolinium based garnets.

In some embodiments, a combination of high Bismuth (Bi) doping combined with Vanadium (V) and/or Zirconium (Zr) induced Calcium (Ca) valency compensation could effectively displace all or most of the Yttrium (Y) in microwave device garnets. Further, certain other high valency ions could also be used on the tetrahedral of octahedral sites and that a fairly high level of octahedral substitution in the garnet structure is preferred in order to obtain minimized magnetic resonance linewidth. Moreover, Yttrium displacement can be accomplished by adding Calcium in addition to Bismuth to the dodecahedral site. Doping the octahedral or tetrahedral sites with higher valency ions, preferably greater than 3+, could allow more Calcium to be introduced to the dodecahedral site to compensate for the charges, which in turn would result in further reduction of Yttrium content. Similar approaches can be taken for Gadolinium based garnets.

Modified Synthetic Garnet Compositions

Disclosed herein are embodiments of synthetic garnets that can have a combination of advantageous properties which can make the material particularly useful for radiofrequency applications, such as below-resonance applications. Specifically, embodiments of the disclosed garnet can have low magnetization while also having high dielectric constants and/or high Curie temperatures. These properties can allow the synthetic garnets to be generally "temperature insensitive" or "temperature stable", meaning that the properties do not drastically change with changes in temperature. Accordingly, embodiments of the disclosure can be advantageous in environments in which they would experience temperature flux, such as caused by heating/cooling of the material during operation. Further, embodiments of the disclosure can be advantageously used for circulator and isolators for radiofrequency devices.

In particular, embodiments of the disclosure can have dielectric constants above 20 (or above about 20) with saturation magnetizations below 1200 (or below about 1200), which can be advantageous for below resonance isolator and circulator applications. In particular, embodiments of the material are particularly useful in the bands above 1 GHz (or above about 1 GHz), though they could be used at higher frequency as well, which are subject to carrier aggregation, and can be related to magnetization (4PiMs) by the gyromagnetic ratio, approximately 2.8 MHz per Gauss of magnetization. Carrier aggregation is the grouping of individual segments of spectra into one continuous band. In some embodiments, the material can be used at frequencies up to 6 GHz (or up to about 6 GHz). As a result, each carrier, rather than having strips of bandwidth distributed throughout the range of allowed spectra, have only one wider band to operate in.

In some embodiments, increased amounts of bismuth, along with balancing charges from other elements, can be added into the crystal structure in order to improve the magnetoelectric properties of the garnet while not reducing other magnetoelectric properties.

In some embodiments, the modified synthetic garnet composition can be defined by a general composition: $Y_{1-x-2y}Bi_xCa_{2y}Fe_{1-z-y}In_zV_yO_{12}$. In some embodiments, $0<x<1.75$. In some embodiments, $1.4<x<1.6$. In some embodiments, $0<y<0.8$. In some embodiments, $0<z<0.7$. In some embodiments, $0.2<z<0.7$. The calcium can be used to compensate for any vanadium added into the structure. In some embodiments, zirconium (Zr) can be used instead of indium (In).

In some embodiments, the modified synthetic garnet composition can be defined by a general composition: $(Y, Gd)_{1-x-2y}Bi_xCa_{2y}Fe_{1-z-y}In_zV_yO_{12}$. In some embodiments, $0<x<1.75$. In some embodiments, $1.4<x<1.6$. In some embodiments, $0<y<0.8$. In some embodiments, $0<z<0.7$. In some embodiments, $0.2<z<0.7$. The calcium can be used to compensate for any vanadium added into the structure. Due to variations in the crystal structure through the use of Gd, the O content may be approximately or about 12, such as 11.97. In some embodiments, zirconium (Zr) can be used instead of indium (In).

In some embodiments, the modified synthetic garnet composition can be defined by a general composition: $Y_{1-x-2y}Bi_xCa_{2y+a}Fe_{1-z-y-a}In_zV_yZr_aO_{12}$. In some embodiments, $0<x<1.75$. In some embodiments, $1.4<x<1.6$. In some embodiments, $0<x<1.6$. In some embodiments, $0<y<0.8$. In some embodiments, $0<z+a<0.7$. In some embodiments, $0.2<z+a<0.7$. In some embodiments, $0<z<0.7$. In some embodiments, $0.2<z<0.7$. In some embodiments, $0<a<0.7$. In some embodiments, $0.2<a<0.7$. In some embodiments, zirconium (Zr) can be used instead of indium (In).

In some embodiments, the modified synthetic garnet composition can be defined by a general composition: $(Y \text{ or } Gd)_{1-x-2y}Bi_xCa_{2y+a}Fe_{1-z-y-a}In_zV_yZr_aO_{12}$. In some embodiments, $0<x<1.75$. In some embodiments, $1.4<x<1.6$. In some embodiments, $0<x<1.6$. In some embodiments, $0<y<0.8$. In some embodiments, $0<z+a<0.7$. In some embodiments, $0.2<z+a<0.7$. In some embodiments, $0<z<0.7$. In some embodiments, $0.2<z<0.7$. In some embodiments, $0<a<0.7$. In some embodiments, $0.2<a<0.7$. Due to variations in the crystal structure through the use of Gd, the O content may be approximately or about 12, such as 11.97. In some embodiments, zirconium (Zr) can be used instead of indium (In).

In some embodiments, about 1.4 formula units of bismuth (Bi) can be substituted for some of the yttrium (Y) and/or gadolinium (Gd) on the dodecahedral site. In some embodiments, greater than about 1.4 formula units of bismuth (Bi) can be substituted for some of the yttrium (Y) and/or gadolinium (Gd) on the dodecahedral site. In some embodiments, between about 1.8 and about 2.0 formula units of bismuth (Bi) and/or gadolinium (Gd) can be substituted for some of the yttrium (Y) on the dodecahedral site. In some embodiments, between about 1.4 and about 2.5 formula units of bismuth (Bi) can be substituted for some of the yttrium (Y) and/or gadolinium (Gd) on the dodecahedral site. In some embodiments, up to 3.0 formula units of bismuth (Bi) can be substituted for some of the yttrium (Y) and/or gadolinium (Gd) on the dodecahedral site. The high levels of bismuth, which can results in advantageous properties, can be achieved through certain atom inclusions and methods of manufacturing, as discussed below.

the saturation magnetization. However, aluminum can depress the Curie temperature of magnetic materials, such as the synthetic garnet, which significantly limits the temperature range of use.

Accordingly, embodiments of the disclosure can be aluminum free (e.g., contain no (or trace amounts of) aluminum). In some embodiments, the composition can contain 0 wt. % aluminum (or about 0 wt. % aluminum). In some embodiments, the composition can contain less than 1, 0.5, 0.1, 0.05, or 0.01 (or less than about 1, about 0.5, about 0.1, about 0.05, or about 0.01) wt. % aluminum. Further, aluminum oxide may not be used in the manufacturing of the material. Typically, aluminum oxide is used as a non-magnetic ion to substitute on the tetrahedral site for Fe and reduce the saturation magnetization of the material. However, it can have the undesirable effect of reducing the Curie temperature. This can allow the synthetic garnets to have high Curie temperatures, as well as the other properties discussed above. In particular, the use of indium and combinations of zirconium and vanadium can produce low magnetization materials with high dielectric constants and Curie temperatures. Thus, embodiments of the disclosure can have improved temperature stability. In some embodiments, the material can be indium free and aluminum free.

Table 1 illustrates example compositional formulas as well as their achieved properties.

TABLE 1

Example Synthetic Garnets and Properties

| Formula | Density (g/cm$^3$) | 3 dB Linewidth (Oe) | Magnetization (4πM) | Curie Temp. (° C.) | Dielectric Constant |
|---|---|---|---|---|---|
| $Bi_{1.4}Y_{.66}Ca_{.94}In_{.4}V_{.47}Fe_{4.13}O_{12}$ | 5.85 | 68 | 1263 | 221.87 | |
| $Bi_{1.4}Y_{.62}Ca_{.98}In_{.4}V_{.49}Fe_{4.11}O_{12}$ | 5.831 | 70 | 1231 | 219.78 | |
| $Bi_{1.4}Y_{.58}Ca_{1.02}In_{.4}V_{.51}Fe_{4.09}O_{12}$ | 5.818 | 67 | 1214 | 217.78 | |
| $Bi_{1.4}Y_{.54}Ca_{1.06}In_{.4}V_{.53}Fe_{4.07}O_{12}$ | 5.799 | 67 | 1175 | 217.88 | |
| $Bi_{1.4}Y_{.50}Ca1_{.11}In_{.4}V_{.55}Fe_{4.05}O_{12}$ | 5.779 | 64 | 1148 | 218.27 | |
| $Bi_{1.4}Y_{.46}Ca_{1.14}In_{.4}V_{.57}Fe_{4.03}O_{12}$ | 5.764 | 62 | 1119 | 216.52 | |
| $Bi_{1.4}Y_{.42}Ca_{1.18}In_{.4}V_{.59}Fe_{4.01}O_{12}$ | 5.754 | 53 | 1069 | 214.41 | |
| $Bi_{1.4}Y_{.38}Ca_{1.22}In_{.4}V_{.61}Fe_{3.99}O_{12}$ | 5.731 | 53 | 1041 | 213.09 | |
| $Bi_{1.4}Y_{.34}Ca_{1.26}In_{.4}V_{.63}Fe_{3.97}O_{12}$ | 5.709 | 47 | 1011 | 211.3 | |
| $Bi_{1.4}Gd_{.24}Ca_{1.36}Zr_{.36}V_{.50}Fe_{4.12}O_{11.97}$ | 5.725 | 39 | 1130 | 222.4 | 26.92 |
| $Bi_{1.46}Gd_{.18}Ca_{1.36}Zr_{.36}V_{.50}Fe_{4.12}O_{11.97}$ | 5.740 | 29 | 1179 | 221.5 | 27.57 |

In some embodiments, indium (In) can be incorporated into the material, for example for Fe or Zr on an octahedral site of the garnet. This can allow for the avoidance of zirconium (Zr), which may require charge balancing by calcium (Ca), as In has a formal charge of +3. Thus, in some embodiments the material may contain no, or only trace amounts, of zirconium. Further, the inclusion of indium does not require charge balancing for compensation. As a result, vanadium may be used to vary the magnetization. The adjustment in the calcium and vanadium content has a less detrimental effect on the Curie temperature than zirconium doped materials. Vanadium is unique among non-magnetic ions in being able to substitute for Fe with minimal degradation in the Curie temperature. However, in other embodiments Fe and/or Zr can remain.

The inclusion can reduce the magnetocrystalline anisotropy energy, thereby improving 3 dB linewidth. Since In, unlike Zr, does not require Ca as a compensating ion, it allows for the substitution of more V into the tetrahedral site allowing for lower magnetization values to be achieved.

Figure 3:
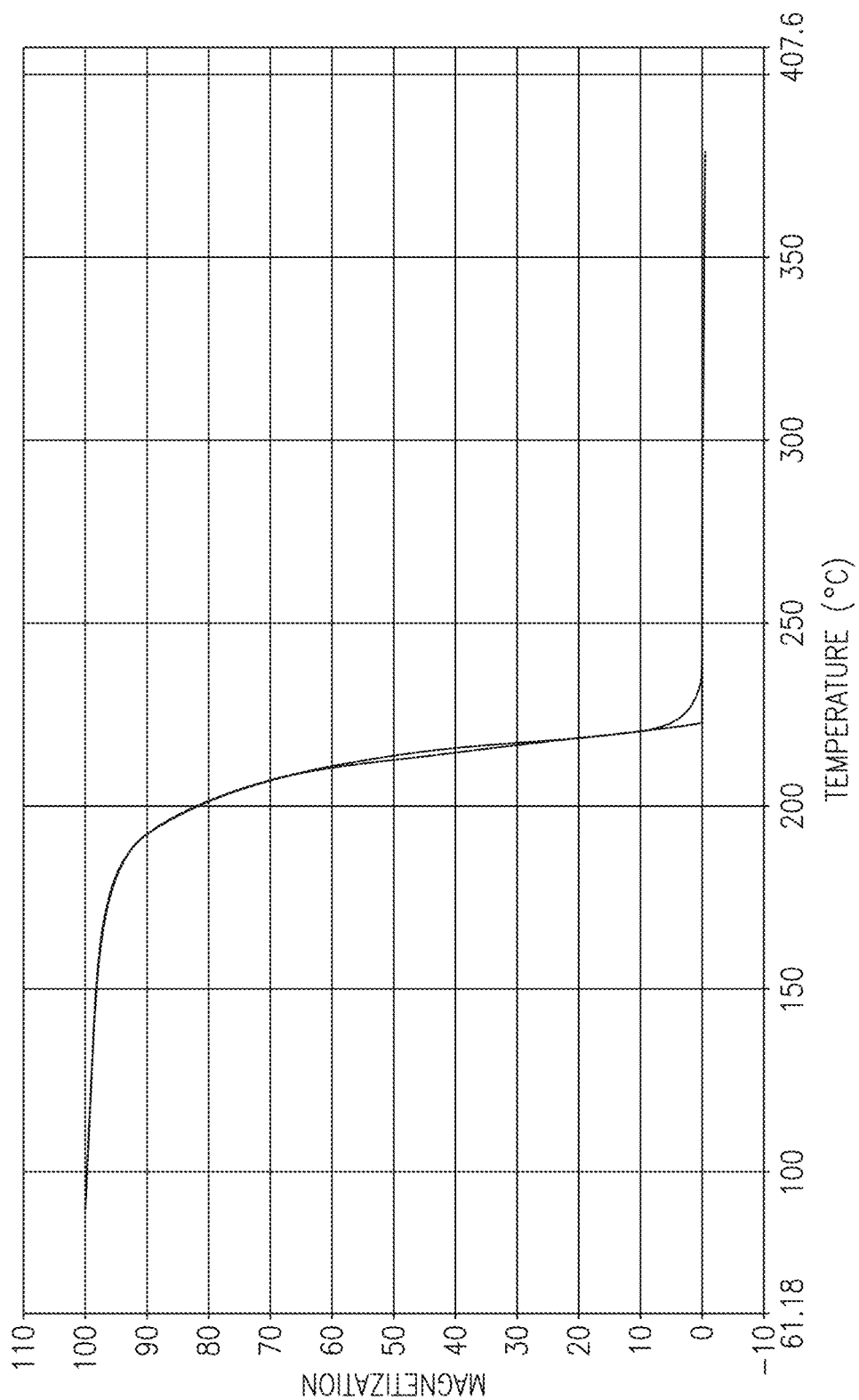
FIG. 3 illustrates shows the effect of the Curie temperature on a material.

In many previous solutions of the art, a large amount of aluminum is typically incorporated into the garnet to modify FIG. 3 illustrates a generalized relationship between magnetization and temperature. The figure shows the temperature where the magnetization falls to zero, known as the Curie temperature. When the magnetization falls to zero, the material can no longer be used as a magnetic material for radiofrequency activity. Accordingly, the Curie temperature dictates the maximum use temperature of the magnetic material, such as in an isolator or circulator. Thus, it can be advantageous to shift the Curie temperature to higher temperatures, thereby allowing for higher operating temperatures. Further, when an increased number of components, such as isolators and circulators, are put close to one another, this can increase the heat. By having the improved Curie temperatures, more isolators and circulators can be placed next to each other, thereby increasing the capacity of operational efficiency.

As shown, many of the materials in Table 1 have high Curie temperatures. In some embodiments, the Curie temperature (in ° C.) can be above 200 (or above about 200), above 210 (or above about 210), above 215 (or above about 215), or above 220 (or above about 220). In some embodiments, the Curie temperatures can be below 230 (or below about 230), below 225 (or below about 225), or below 220 (or below about 220). In some embodiments, the maximum operating temperature of the material is at least 50° C. less (or at least about 50° C. less) than the Curie temperature of the material.

Improvements in the Curie temperature allow for the material to be used in an increased temperature range as the Curie temperature is essentially the maximum temperature the material would work at. If a magnet is heated up enough, e.g., beyond the Curie temperature, it would lose its magnetization which would make the material non-usable for RF applications. While the magnetization loss is not a step function (e.g., it doesn't drop immediately to 0), magnetization does decrease after the Curie temperature, in some embodiments relatively quickly. Accordingly, the further away from the use temperature the Curie temperature is, the better temperature stability the material to have. Thus, it can be advantageous to have a significant space between the operating temperature and the Curie temperature (such as at least about 50° C.). Further, it can be advantageous to avoid temperature fluctuations as this would cause variations in resonant frequency.

The relationship between Curie temperature and device operating temperature below resonance can depend on the achievable bandwidth at the operating temperature, which in turn can depends on the magnetization at that temperature. However, consideration can also be given to the magnetization at the lowest frequency at the lowest temperature. So the variation of the magnetization with temperature is the real determinant, which to some extent depends on the Curie temperature's effect on the magnetization/temperature slope.

In some embodiments, the disclosed material (and thus the devices utilizing the disclosed material) can be completely temperature independent from −20° C. to 100° C. (or between about −20° C. and about 100° C.) (e.g., these temperatures are below the Curie temperature as the magnetization starts to decrease well below the Curie temperature). In some embodiments, the disclosed material (and thus the devices utilizing the disclosed material) can be completely temperature independent from −20° C. to 150° C. (or between about −20° C. and about 150° C.) (e.g., these temperatures are below the Curie temperature as the magnetization starts to decrease well below the Curie temperature). In some embodiments, the disclosed material (and thus the devices utilizing the disclosed material) can be completely temperature independent from −20° C. to 200° C. (or between about −20° C. and about 200° C.) (e.g., these temperatures are below the Curie temperature as the magnetization starts to decrease well below the Curie temperature).

In some embodiments, the disclosed material (and thus the devices utilizing the disclosed material) can be completely temperature independent from 0° C. to 100° C. (or between about 0° C. and about 100° C.) (e.g., these temperatures are below the Curie temperature as the magnetization starts to decrease well below the Curie temperature). In some embodiments, the disclosed material (and thus the devices utilizing the disclosed material) can be completely temperature independent from 0° C. to 150° C. (or between about 0° C. and about 150° C.) (e.g., these temperatures are below the Curie temperature as the magnetization starts to decrease well below the Curie temperature). In some embodiments, the disclosed material (and thus the devices utilizing the disclosed material) can be completely temperature independent from 0° C. to 200° C. (or between about 0° C. and about 200° C.) (e.g., these temperatures are below the Curie temperature as the magnetization starts to decrease well below the Curie temperature).

In some embodiments, temperature independent can mean that the material undergoes less than a 5 (or about 5) gauss change in magnetization per 10° C. temperature change. In some embodiments, temperature independent can mean that the material undergoes less than a 3 (or about 3) gauss change in magnetization per 10° C. temperature change. In some embodiments, temperature independent can mean that the material undergoes less than a 1 (or about 1) gauss change in magnetization per 10° C. temperature change. In some embodiments, temperature independent can mean that the material undergoes less than a 0.5 (or about 0.5) gauss change in magnetization per 5° C. temperature change. In some embodiments, temperature independent can mean that the material undergoes less than a 0.3 (or about 0.3) gauss change in magnetization per 5° C. temperature change. In some embodiments, temperature independent can mean that the material undergoes less than a 0.1 (or about 0.1) gauss change in magnetization per 5° C. temperature change.

As an example, for a 1.8 to 2.7 GHz device, an advantageous material can have a room temperature 4PiMs of 700 Gauss, but a Curie temperature of at least 180° C. using only a single transformer, which would give just the right bandwidth at room temperature. However, there can be a balance between size and fragility of the transformer as too small of a transformer may be too weak to withstand application.

Above resonance can be more straightforward, the main consideration is magnetization for bandwidth at the highest temperature. For most applications, the Curie temperature can exceed 200° C. at magnetizations in the 1600-2000 Gauss region, with real linewidths less than 40 Oe. At 1200 Gauss, Curie temperatures in the 180-200° C. range is likely acceptable, but the linewidth may be minimized to below about 20 Oe.

In general, for above-resonance applications, any material can be used at any frequency, however the main trade-off is the bandwidth v. the level of biasing field required for the given frequency. Higher magnetization will provide a broader bandwidth device but will also require a higher level of biasing field. Higher biasing fields are also required for higher operating frequencies, this is usually the limiting factor to the magnetization level of the material used In addition to the Curie temperatures discussed above, many of the materials disclosed herein have high dielectric constants. For example, in some embodiments the material may have a dielectric constant above 20 (or above about 20), above 21 (or above about 21), above 22 (or above about 22), above 23 (or above about 23), above 24 (or above about 24), above 25 (or above about 25), above 26 (or above about 26), or above 27 (or above about 27). In some embodiments, the material can have a dielectric constant below 30 (or below about 30), below 27 (or below about 27), below 26 (or below about 26), or below 25 (or below about 25). In some embodiments, the material can have a dielectric constant of between 24 and 30 (or between about 24 and about 30). In some embodiments, the material can have a dielectric constant of between 24 and 28 (or between about 24 and about 28).

In some embodiments, it can be advantageous to keep the material with a 3 dB linewidth of below a certain level, e.g., minimizing the linewidth. In some embodiments, the 3 dB linewidth can be below 100 (or below about 100), below 80 (or below about 80), below 60 (or below about 60), or below 50 (or below about 50). In some embodiments, the 3 dB linewidth can be above 40 (or above about 40), above 50 (or above about 50), or about 60 (or above about 60).

In some embodiments, the material can have high magnetization. In some embodiments, the magnetization range can be between 400 and 1600 gauss (or about 400 and about 1600 gauss). In some embodiments, the magnetization range can be between 800 and 1400 gauss (or between about 800 and about 1400 gauss). In some embodiments, the material can have a magnetization of above 1000 (or above about 1000), above 1100 (or above about 1100), or above 1200 (or above about 1200) gauss. In some embodiments, the magnetization can be below 1200 (or below about 1200), below 1100 (or below about 1100), or below 1000 (or below about 1000) gauss.

Preparation of the Modified Synthetic Garnet Compositions:

The preparation of the modified synthetic garnet materials can be accomplished by using known ceramic techniques. A particular example of the process flow is illustrated in FIG. 4.

Figure 4:
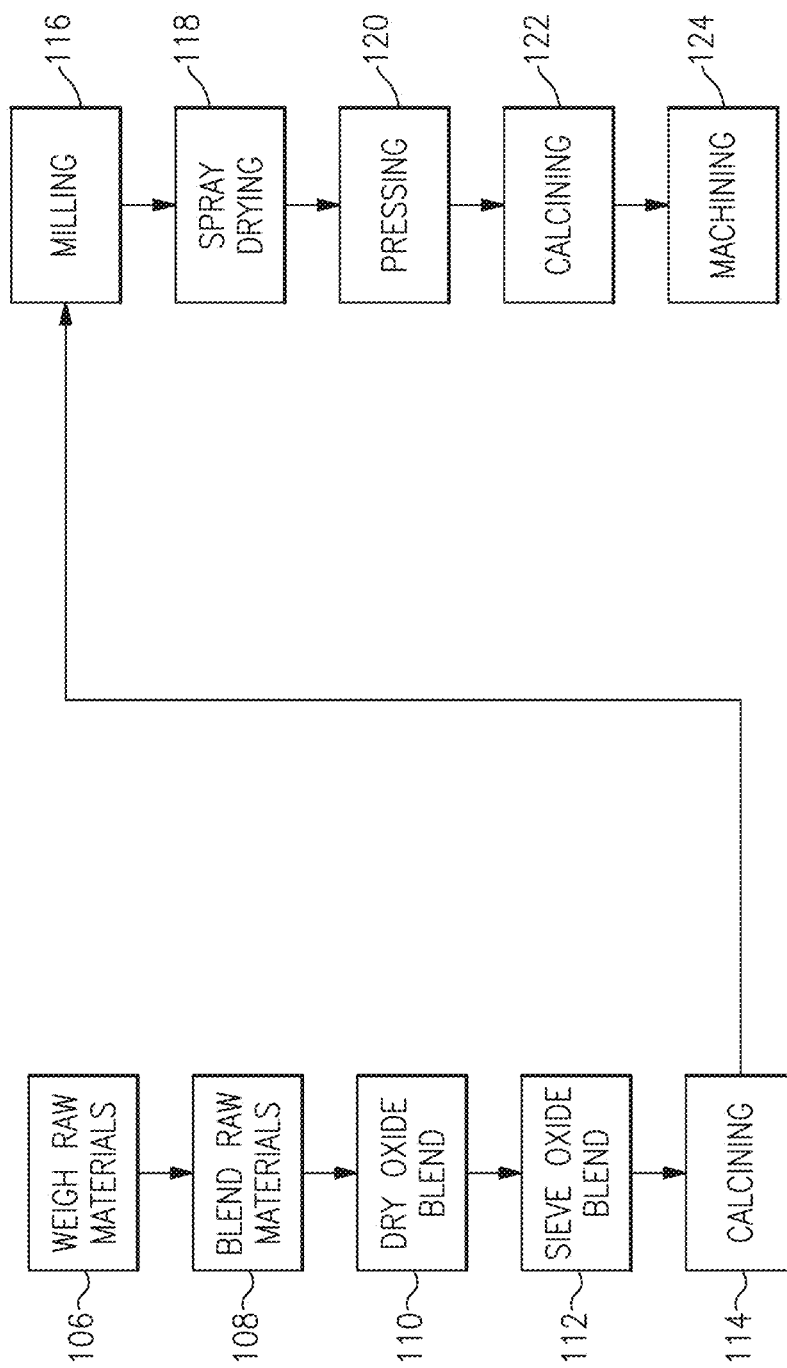
FIG. 4 illustrates an example process flow for making an embodiment of a modified synthetic garnet having one or more features described herein.

As shown in FIG. 4, the process begins with step 106 for weighing the raw material. The raw material may include oxides and carbonates such as Iron Oxide ($Fe_2O_3$), Bismuth Oxide ($Bi_2O_3$), Yttrium Oxide ($Y_2O_3$), Calcium Carbonate ($CaCO_3$), Zirconium Oxide ($ZrO_2$), Gadolinium Oxide ($Gd_2O_3$), Vanadium Pentoxide ($V_2O_5$), Yttrium Vanadate ($YVO_4$), Bismuth Niobate ($BiNbO_4$), Silica ($SiO_2$), Niobium Pentoxide ($Nb_2O_5$), Antimony Oxide ($Sb_2O_3$), Molybdenum Oxide ($MoO_3$), Indium Oxide ($In_2O_3$), or combinations thereof. In one embodiment, raw material consisting essentially of about 35-40 wt % Bismuth Oxide, more preferably about 38.61 wt %; about 10-12 wt % Calcium Oxide, more preferably about 10.62 wt %; about 35-40 wt % Iron Oxide, more preferably about 37 wt %, about 5-10 wt % Zirconium Oxide, more preferably about 8.02 wt %; about 4-6 wt % Vanadium Oxide, more preferably about 5.65 wt %. In addition, organic based materials may be used in a sol gel process for ethoxides and/or acrylates or citrate based techniques may be employed. Other known methods in the art such as co-precipitation of hydroxides, sol-gel, or laser ablation may also be employed as a method to obtain the materials. The amount and selection of raw material depend on the specific formulation.

After the raw materials are weighed, they are blended in Step 108 using methods consistent with the current state of the ceramic art, which can include aqueous blending using a mixing propeller, or aqueous blending using a vibratory mill with steel or zirconia media. In some embodiments, a glycine nitrate or spray pyrolysis technique may be used for blending and simultaneously reacting the raw materials.

The blended oxide is subsequently dried in Step 110, which can be accomplished by pouring the slurry into a pane and drying in an oven, preferably between 100-400° C. or by spray drying, or by other techniques known in the art.

The dried oxide blend is processed through a sieve in Step 112, which homogenizes the powder and breaks up soft agglomerates that may lead to dense particles after calcining.

The material is subsequently processed through a pre-sintering calcining in Step 114. Preferably, the material is loaded into a container such as an alumina or cordierite sagger and heat treated in the range of about 800-1000° C. In some embodiments, a heat treatment in the range of about 500-1000° C. can be used. In some embodiments, a heat treatment in the range of about 900-950° C. can be used. In some embodiments, a heat treatment in the range of about 500-700° C. can be used. Preferably, the firing temperature is low as higher firing temperatures have an adverse effect on linewidth.

After calcining, the material is milled in Step 116, preferably in a vibratory mill, an attrition mill, a jet mill or other standard comminution technique to reduce the median particle size into the range of about 0.01 to 0.1 microns, though in some embodiments larger sizes such as 0.5 micron to 10 microns can be used as well. Milling is preferably done in a water based slurry but may also be done in ethyl alcohol or another organic based solvent.

The material is subsequently spray dried in Step 118. During the spray drying process, organic additives such as binders and plasticizers can be added to the slurry using techniques known in the art. The material is spray dried to provide granules amenable to pressing, preferably in the range of about 10 microns to 150 microns in size.

The spray dried granules are subsequently pressed in Step 120, preferably by uniaxial or isostatic pressing to achieve a pressed density to as close to 60% of the x-ray theoretical density as possible. In addition, other known methods such as tape casting, tape calendaring or extrusion may be employed as well to form the unfired body.

The pressed material is subsequently processed through a calcining process in Step 122. Preferably, the pressed material is placed on a setter plate made of material such as alumina which does not readily react with the garnet material. The setter plate is heated in a periodic kiln or a tunnel kiln in air or pressure oxygen in the range of between about 850° C.-1000° C. to obtain a dense ceramic compact. In some embodiments, a heat treatment in the range of about 500-1000° C. can be used. In some embodiments, a heat treatment in the range of about 500-700° C. can be used. Other known treatment techniques, such as induction heat, hot pressing, fast firing, or assisted fast firing, may also be used in this step. In some embodiments, a density having >98% of the theoretical density can be achieved.

The dense ceramic compact is machined in the Step 124 to achieve dimensions suitable or the particular applications.

Devices Incorporating Ultra High Dielectric Constant Garnet

Radio-frequency (RF) applications that utilize synthetic garnet compositions, such as those disclosed above, can include ferrite devices having relatively low magnetic resonance linewidths. RF applications can also include devices, methods, and/or systems having or related to garnet compositions having reduced or substantially nil reduced earth content. As described herein, such garnet compositions can be configured to yield relatively high dielectric constants; and such a feature can be utilized to provide advantageous functionalities. It will be understood that at least some of the compositions, devices, and methods described in reference above can be applied to such implementations.

Figure 5:
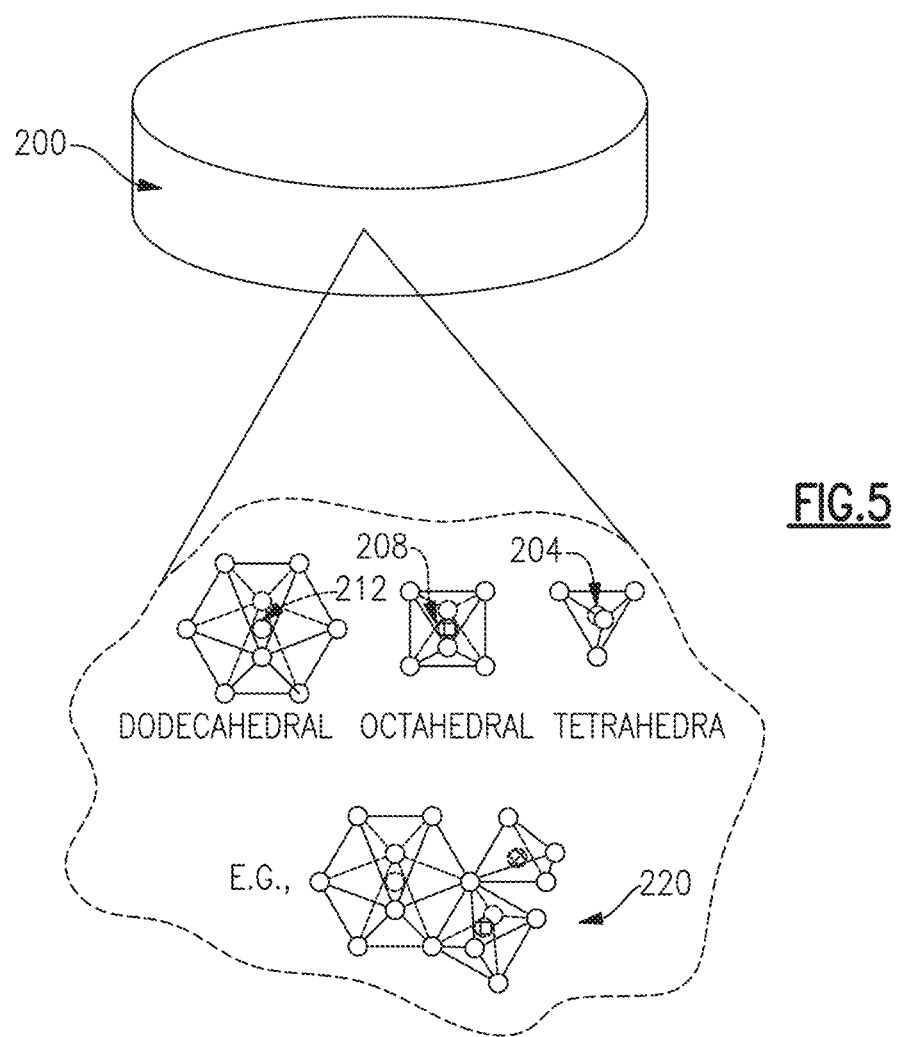
FIG. 5 shows an example ferrite device having one or more garnet features as described herein.

FIG. 5 shows a radio-frequency (RF) device 200 having garnet structure and chemistry such as disclosed herein, and thus a plurality of dodecahedral structures, octahedral structures, and tetrahedral structures. The device 200 can include garnet structures (e.g., a garnet structure 220) formed from such dodecahedral, octahedral, and tetrahedral structures. Disclosed herein are various examples of how dodecahedral sites 212, octahedral sites 208, and tetrahedral sites 204 can be filled by or substituted with different ions to yield one or more desirable properties for the RF device 200. Such properties can include, but are not limited to desirable RF properties and cost-effectiveness of manufacturing of ceramic materials that can be utilized to fabricate the RF device 200. By way of an example, disclosed herein are ceramic materials having relatively high dielectric constants, and having reduced or substantially nil rare earth contents.

Some design considerations for achieving such features are now described. Also described are example devices and related RF performance comparisons. Also described are example applications of such devices, as well as fabrication examples.

Bismuth Garnets:

Single crystal materials with a formula $Bi_{(3-2x)}Ca_{2x}Fe_{5-x}V_xO_{12}$ have been grown in the past, where x was 1.25. A $4\pi Ms$ value of about 600 Gauss was obtained (which is suitable for some tunable filters and resonators in a 1-2 GHz range), with linewidths of about 1 Oersted, indicating low intrinsic magnetic losses for the system. However, the level of Bi substitution was only about 0.5 in the formula.

Attempts to make single phase polycrystalline materials (with a formula $Bi_{3-2x}Ca_{2x}V_xFe_{5-x}O_{12}$) similar to the single crystal materials were successful only in a region of x>0.96, effectively confining the $4\pi Ms$ to less than about 700 Oersted and resulting in poor linewidths (greater than 100 Oersted). Small amounts of $Al^{3+}$ reduced the linewidth to about 75 Oersted, but increased $Al^{3+}$ reduced $4\pi Ms$. Bi substitution was only about 0.4 in the formula for these materials.

For Faraday rotation devices, the Faraday rotation can be essentially proportionate to the level of Bi substitution in garnets, raising interest in increasing the level of substitution. Anisotropy is generally not a major factor for optical applications, so substitution on the octahedral and tetrahedral site can be based on maximizing the rotation. Thus, in such applications, it may be desirable to introduce as much $Bi^{3+}$ into the dodecahedral site as possible. The maximum level of $Bi^{3+}$ can be influenced by the size of the dodecahedral rare earth trivalent ion.

In some situations, the level of $Bi^{3+}$ substitution can be affected by substitutions on the other sites. Because $Bi^{3+}$ is non-magnetic, it can influence the Faraday rotation through its effect on the tetrahedral and octahedral $Fe^{3+}$ ions. Since this is thought to be a spin-orbital interaction, where $Bi^{3+}$ modifies existing $Fe^{3+}$ pair transitions, one can expect both a change in the anisotropy of the $Fe^{3+}$ ions and optical effects including large Faraday rotation. The Curie temperature of $Bi^{3+}$ substituted YIG can also increase at low $Bi^{3+}$ substitution.

Examples of Devices Having Rare Earth Free or Reduced Garnets:

As described herein, garnets having reduced or no rare earth content can be formed, and such garnets can have desirable properties for use in devices for applications such as RF applications. In some implementations, such devices can be configured to take advantage of unique properties of the $Bi^{3+}$ ion. For example, the "lone pair" of electrons on the $Bi^{3+}$ ion can raise the ionic polarizability and hence the dielectric constant.

Further, because the center frequency of a ferrite device (such as a garnet disk) operating in a split polarization transverse magnetic (TM) mode is proportional to $1/(\varepsilon)^{1/2}$, doubling the dielectric constant ($\varepsilon$) can reduce the frequency by a factor of square root of 2 (approximately 1.414). As described herein in greater detail, increasing the dielectric constant by, for example, a factor of 2, can result in a reduction in a lateral dimension (e.g., diameter) of a ferrite disk by factor of square root of 2. Accordingly, the ferrite disk's area can be reduced by a factor of 2. Such a reduction in size can be advantageous since the device's footprint area on an RF circuit board can be reduced (e.g., by a factor of 2 when the dielectric constant is increased by a factor of 2). Although described in the context of the example increase by a factor of 2, similar advantages can be realized in configurations involving factors that are more or less than 2.

Reduced Size Circulators/Isolators Having Ferrite with High Dielectric Constant

As described herein, ferrite devices having garnets with reduced or no rare earth content can be configured to include a high dielectric constant property. Various design considerations concerning dielectric constants as applied to RF applications are now described. In some implementations, such designs utilizing garnets with high dielectric constants may or may not necessarily involve rare earth free configurations.

Values of dielectric constant for microwave ferrite garnets and spinels commonly fall in a range of 12 to 18 for dense polycrystalline ceramic materials. Such garnets are typically used for above ferromagnetic resonance applications in, for example, UHF and low microwave region, because of their low resonance linewidth. Such spinels are typically used at, for example, medium to high microwave frequencies, for below resonance applications, because of their higher magnetization. Most, if not substantially all, circulators or isolators that use such ferrite devices are designed with triplate/stripline or waveguide structures.

Dielectric constant values for low linewidth garnets is typically in a range of 14 to 16. These materials can be based on Yttrium iron garnet (YIG) with a value of approximately 16, or substituted versions of that chemistry with Aluminum or, for example, Zirconium/Vanadium combinations which can reduce the value to around 14. Although for example Lithium Titanium based spinel ferrites exist with dielectric constants up to close to 20, these generally do not have narrow linewidths; and thus are not suitable for many RF applications. However, as described in detail above, garnets made using Bismuth substituted for Yttrium can have much higher dielectric constants.

In some embodiments, an increase in dielectric constant can be maintained for compositions containing Bismuth, including those with other non-magnetic substitution on either or both of the octahedral and tetrahedral sites (e.g., Zirconium or Vanadium, respectively). By using ions of higher polarization, it is possible to further increase the dielectric constant. For example, Niobium or Titanium can be substituted into the octahedral or tetrahedral site; and Titanium can potentially enter both sites.

In some embodiments, a relationship between ferrite device size, dielectric constant, and operating frequency can be represented as follows. There are different equations that can characterize different transmission line representations. For example, in above-resonance stripline configurations, the radius R of a ferrite disk can be characterized as $$R=1.84/[2\pi(\text{effective permeability})\times(\text{dielectric constant})]^{1/2} \quad (1)$$

where (effective permeability)=$H_{dc}$+4 $\pi Ms/H_{dc}$, with $H_{dc}$ being the magnetic field bias. Equation 1 shows that, for a fixed frequency and magnetic bias, the radius R is inversely proportional to the square root of the dielectric constant.

In another example, in below-resonance stripline configurations, a relationship for ferrite disk radius R similar to Equation 1 can be utilized for weakly coupled quarter wave circulators where the low bias field corresponds to below-resonance operation. For below-resonance waveguide configurations (e.g., in disk or rod waveguides), both lateral dimension (e.g., radius R) and thickness d of the ferrite can influence the frequency. However, the radius R can still be expressed as $$R=\lambda/[2\pi(\text{dielectric constant})^{1/2}][((\pi R)/(2d))^2+(1.84)^2]^{1/2} \quad (2)$$

which is similar to Equation 1 in terms of relationship between R and dielectric constant.

The example relationship of Equation 2 is in the context of a circular disk shaped ferrites. For a triangular shaped resonator, the same waveguide expression can used, but in this case, A (altitude of the triangle) being equal to 3.63× λ/2π applies instead of the radius in the circular disk case.

In all of the foregoing example cases, one can see that by increasing the dielectric constant (e.g., by a factor of 2), one can expect to reduce the size of the ferrite (e.g., circular disk or triangle) by a factor of square root of 2, and thereby reduce the area of the ferrite by a factor of 2. As described in reference to Equation 2, thickness of the ferrite can also be reduced.

In implementations where ferrite devices are used as RF devices, sizes of such RF devices can also be reduced. For example, in a stripline device, a footprint area of the device can be dominated by the area of the ferrite being used. Thus, one can expect that a corresponding reduction in device size would be achieved. In a waveguide device, a diameter of the ferrite being used can be a limiting factor in determining size. However, a reduction provided for the ferrite diameter may be offset by the need to retain wavelength-related dimensions in the metal part of the junction.

Examples of Reduced-Size Ferrite

As described herein, ferrite size can be reduced significantly by increasing the dielectric constant associated with garnet structures. Also as described herein, garnets with reduced Yttrium and/or reduced non-Y rare earth content can be formed by appropriate Bismuth substitutions. In some embodiments, such garnets can include Yttrium-free or rare earth free garnets. An example RF device having ferrite devices with increased dielectric constant and Yttrium-free garnets is described in reference to FIGS. 6-7.

Figure 6A:
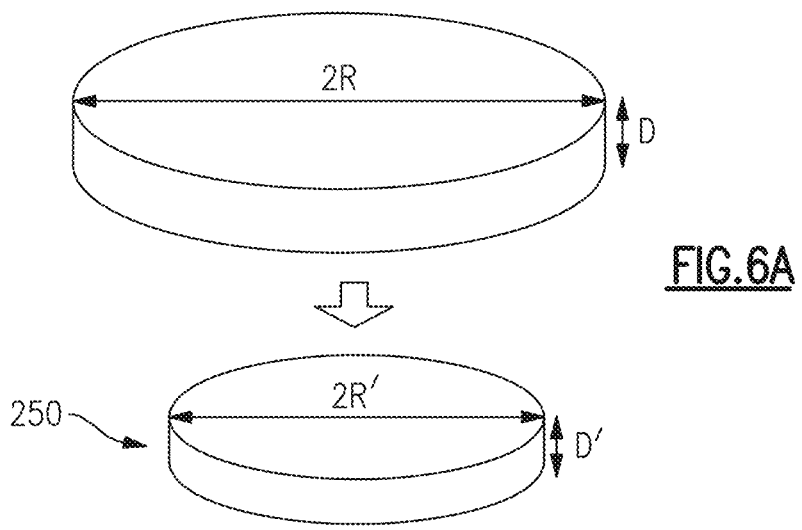
FIGS. 6A and 6B show examples of size reduction that can be implemented for ferrite devices having one or more features as described herein.
Figure 6B:
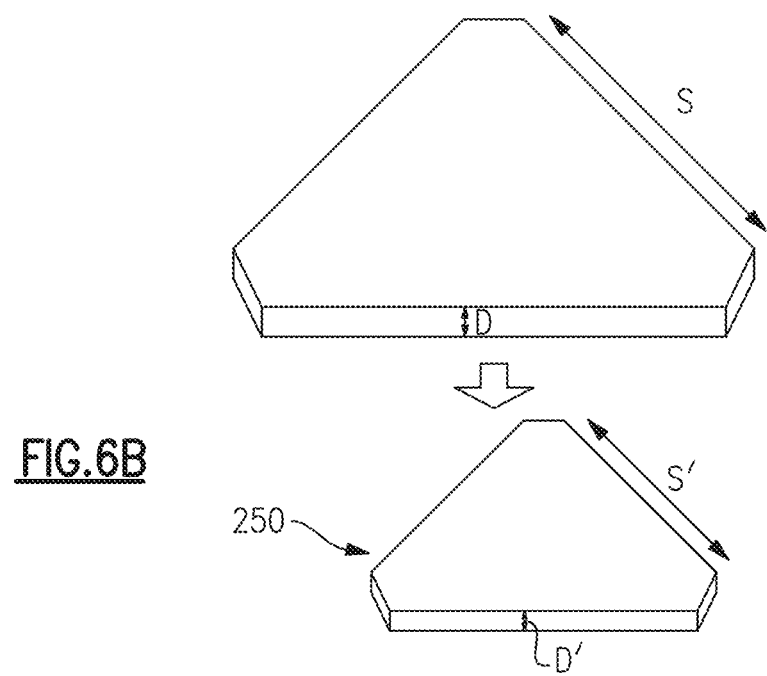

FIGS. 6A and 6B summarize the example ferrite size reductions described herein. As described herein and shown in FIG. 6A, a ferrite device 250 can be a circular-shaped disk having a reduced diameter of 2R' and a thickness of d'. The thickness may or may not be reduced. As described in reference to Equation 1, the radius R of a circular-shaped ferrite disk can be inversely proportional to the square root of the ferrite's dielectric constant. Thus, the increased dielectric constant of the ferrite device 250 is shown to yield its reduced diameter 2R'.

As described herein and shown in FIG. 6B, a ferrite device 250 can also be a triangular-shaped disk having a reduced side dimension of S' and a thickness of d'. The thickness may or may not be reduced. As described in reference to Equation 2, the altitude A of a triangular-shaped ferrite disk (which can be derived from the side dimension S) can be inversely proportional to the square root of the ferrite's dielectric constant. Thus, the increased dielectric constant of the ferrite device 250 is shown to yield its reduced dimension S'.

Although described in the context of example circular and triangle shaped ferrites, one or more features of the present disclosure can also be implemented in other shaped ferrites.

Figure 7A:
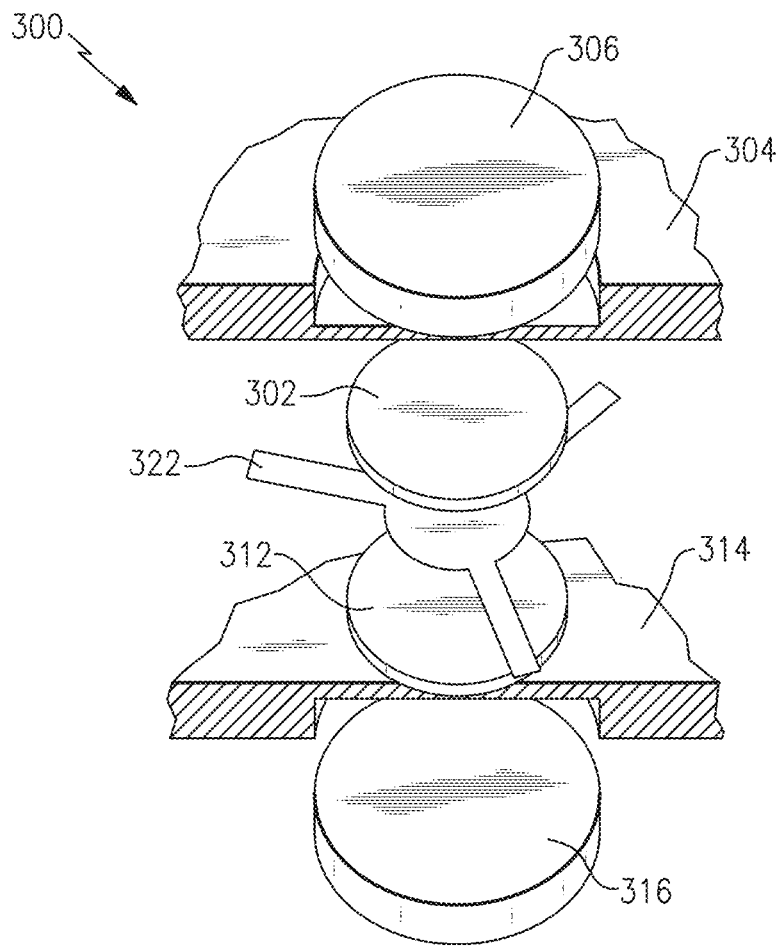
FIGS. 7A and 7B show an example circulator/isolator having ferrite devices as described herein.
Figure 7B:
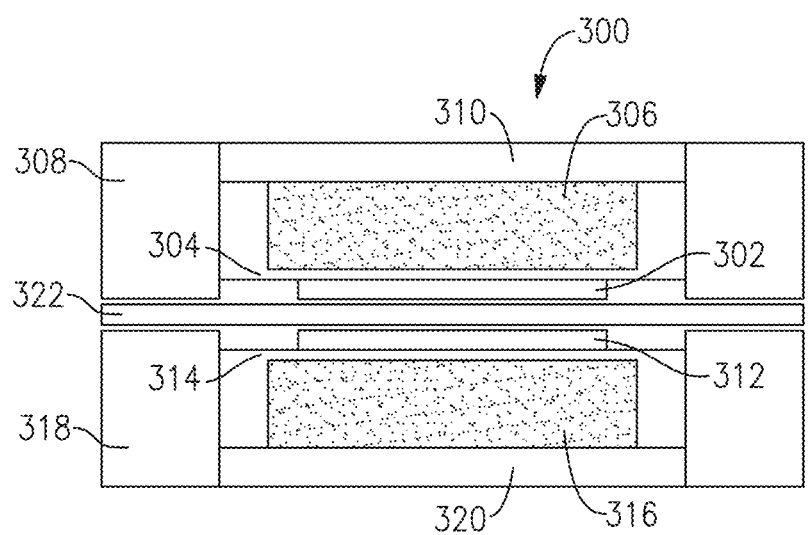

FIGS. 7A and 7B show an example of a circulator 300 having a pair of ferrite disks 302, 312 disposed between a pair of cylindrical magnets 306, 316. Each of the ferrite disks 302, 312 can be a ferrite disk having one or more features described herein. FIG. 7A shows an un-assembled view of a portion of the example circulator 300. FIG. 7B shows a side view of the example circulator 300.

In the example shown, the first ferrite disk 302 is shown to be mounted to an underside of a first ground plane 304. An upper side of the first ground plane 304 is shown to define a recess dimensioned to receive and hold the first magnet 306. Similarly, the second ferrite disk 312 is shown to be mounted to an upper side of a second ground plane 314; and an underside of the second ground plane 314 is shown to define a recess dimensioned to receive and hold the second magnet 316.

The magnets 306, 316 arranged in the foregoing manner can yield generally axial field lines through the ferrite disks 302, 312. The magnetic field flux that passes through the ferrite disks 302, 312 can complete its circuit through return paths provided by 320, 318, 308 and 310 so as to strengthen the field applied to the ferrite disks 302, 312. In some embodiments, the return path portions 320 and 310 can be disks having a diameter larger than that of the magnets 316, 306; and the return path portions 318 and 308 can be hollow cylinders having an inner diameter that generally matches the diameter of the return path disks 320, 310. The foregoing parts of the return path can be formed as a single piece or be an assembly of a plurality of pieces.

The example circulator device 300 can further include an inner flux conductor (also referred to herein as a center conductor) 322 disposed between the two ferrite disks 302, 312. Such an inner conductor can be configured to function as a resonator and matching networks to the ports (not shown).

Various examples of new garnet systems and devices related thereto are described herein. In some embodiments, such garnet systems can contain high levels of Bismuth, which can allow formation of low loss ferrite devices. Further, by selected addition of other elements, one can reduce or eliminate rare earth content of garnets, including commercial garnets. Reduction or elimination of such rare earth content can include, but is not limited to, Yttrium. In some embodiments, the garnet systems described herein can be configured to significantly increase (e.g., double) the dielectric constant of non-Bi garnets, thereby offering the possibility of significantly decreasing (e.g., halving) the printed circuit "footprint" of ferrite devices associated with conventional garnets.

Figure 8:
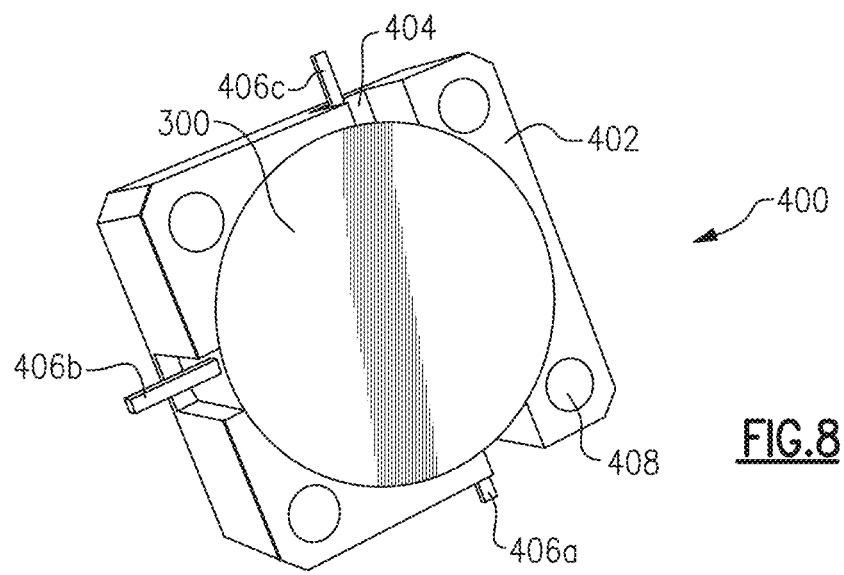
FIG. 8 shows an example of a packaged circulator module.

In some embodiments, ferrite-based circulator devices having one or more features as described herein can be implemented as a packaged modular device. FIG. 8 shows an example packaged device 400 having a circulator device 300 (for example as shown in FIG. 7B) mounted on a packaging platform 404 and enclosed by a housing structure 402. The example platform 404 is depicted as including a plurality of holes 408 dimensioned to allow mounting of the packaged device 400. The example packaged device 400 is shown further include example terminals 406a-406c configured to facilitate electrical connections.

Figure 18:
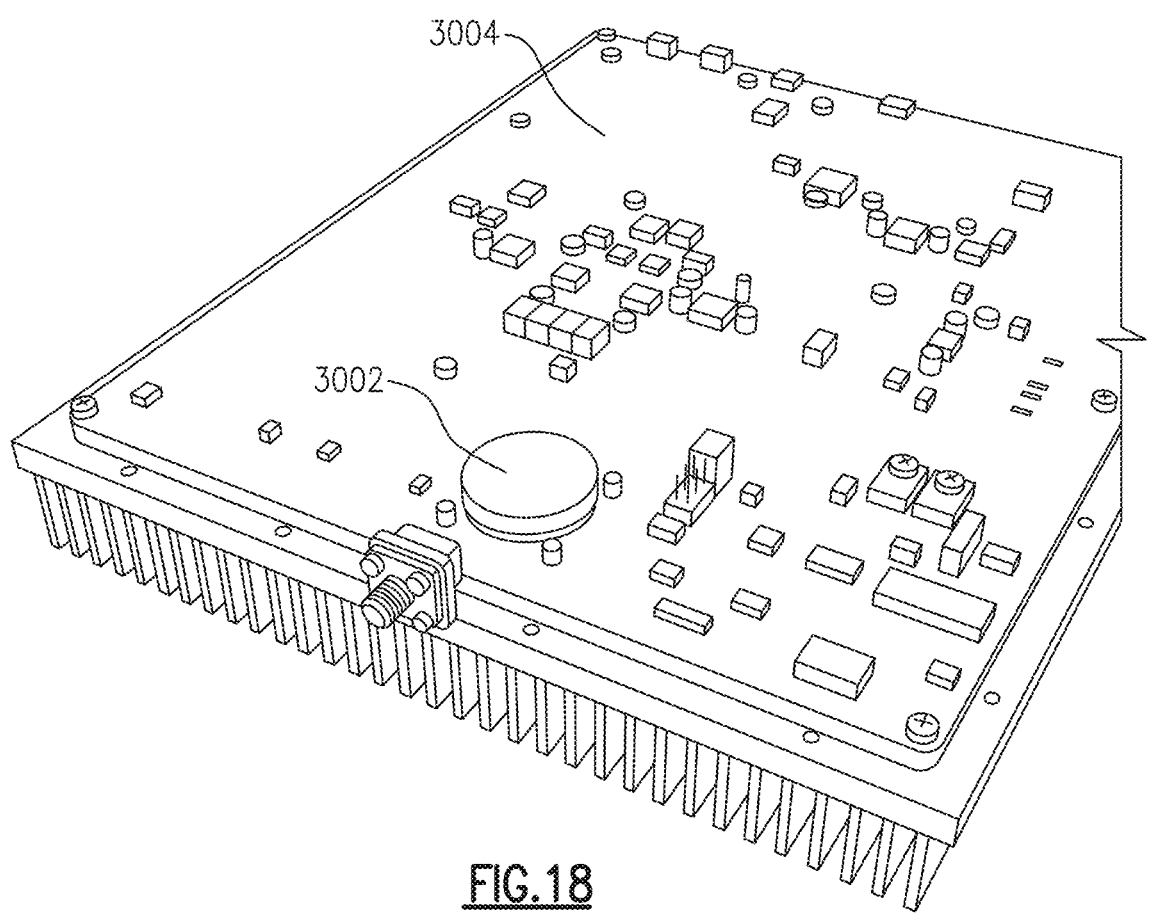
FIG. 18 illustrates an embodiment of a circuit board including embodiments of the material disclosed herein.

In some embodiments, a packaged circulator/isolator 3002 such as the example of FIG. 8 can be implemented in a circuit board or module 3004 as shown in FIG. 18. Such a circuit board can include a plurality of circuits configured to perform one or more radio-frequency (RF) related operations. The circuit board can also include a number of connection features configured to allow transfer of RF signals and power between the circuit board and components external to the circuit board.

Figure 9:
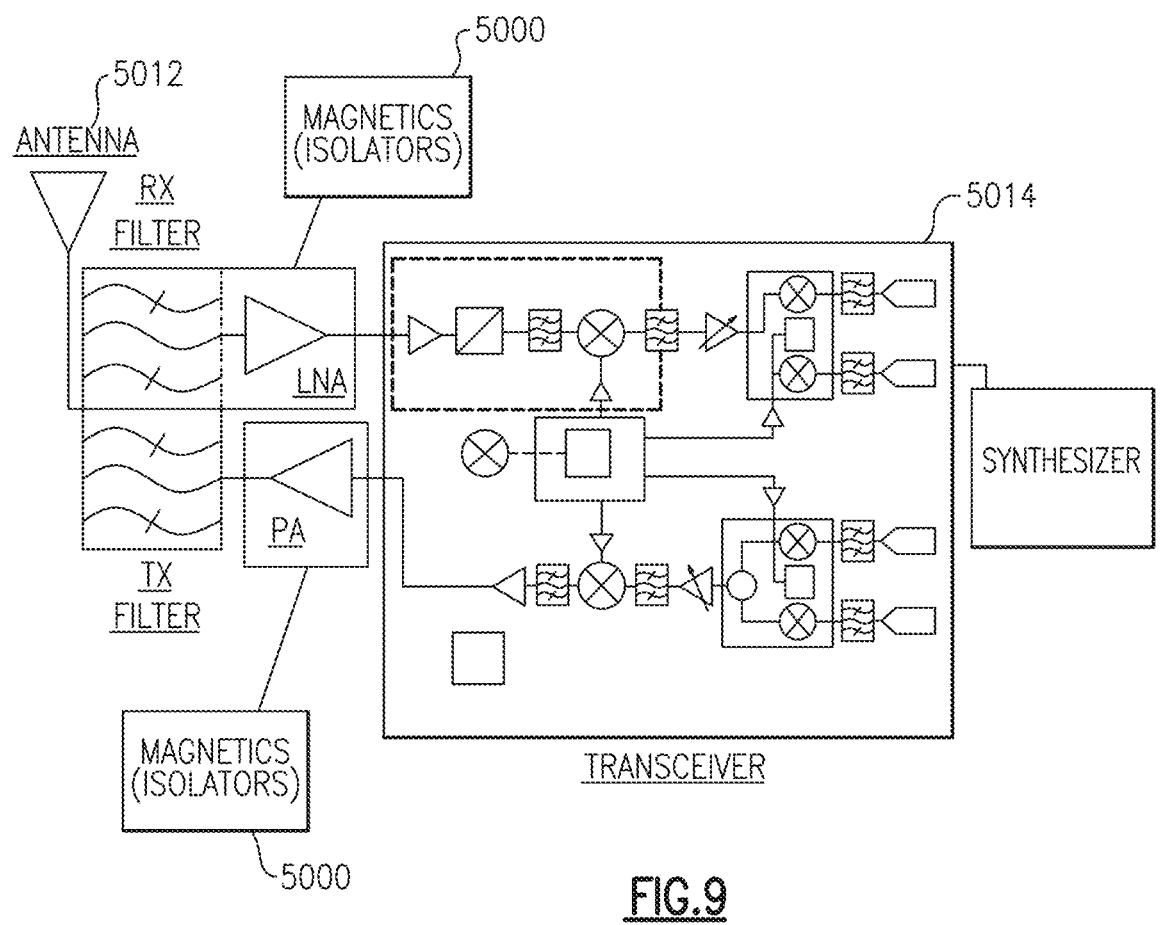
FIG. 9 shows an example RF system where one or more of circulator/isolator devices as described herein can be implemented.

In some embodiments, the foregoing example circuit board can include RF circuits associated with a front-end module of an RF apparatus. As shown in FIG. 9, such an RF apparatus can include an antenna 5012 that is configured to facilitate transmission and/or reception of RF signals. Such signals can be generated by and/or processed by a transceiver 5014. For transmission, the transceiver 5014 can generate a transmit signal that is amplified by a power amplifier (PA) and filtered (Tx Filter) for transmission by the antenna 5012. For reception, a signal received from the antenna 5012 can be filtered (Rx Filter) and amplified by a low-noise amplifier (LNA) before being passed on to the transceiver 5014. In the example context of such Tx and Rx paths, circulators and/or isolators 5000 having one or more features as described herein can be implemented at or in connection with, for example, the PA circuit and the LNA circuit.

In some embodiments, circuits and devices having one or more features as described herein can be implemented in RF applications such as a wireless base-station. Such a wireless base-station can include one or more antennas 5012, such as the example described in reference to FIG. 9, configured to facilitate transmission and/or reception of RF signals. Such antenna(s) can be coupled to circuits and devices having one or more circulators/isolators as described herein.

As described herein, terms "circulator" and "isolator" can be used interchangeably or separately, depending on applications as generally understood. For example, circulators can be passive devices utilized in RF applications to selectively route RF signals between an antenna, a transmitter, and a receiver. If a signal is being routed between the transmitter and the antenna, the receiver preferably should be isolated. Accordingly, such a circulator is sometimes also referred to as an isolator; and such an isolating performance can represent the performance of the circulator.

Fabrication of RF Devices

Figure 10:
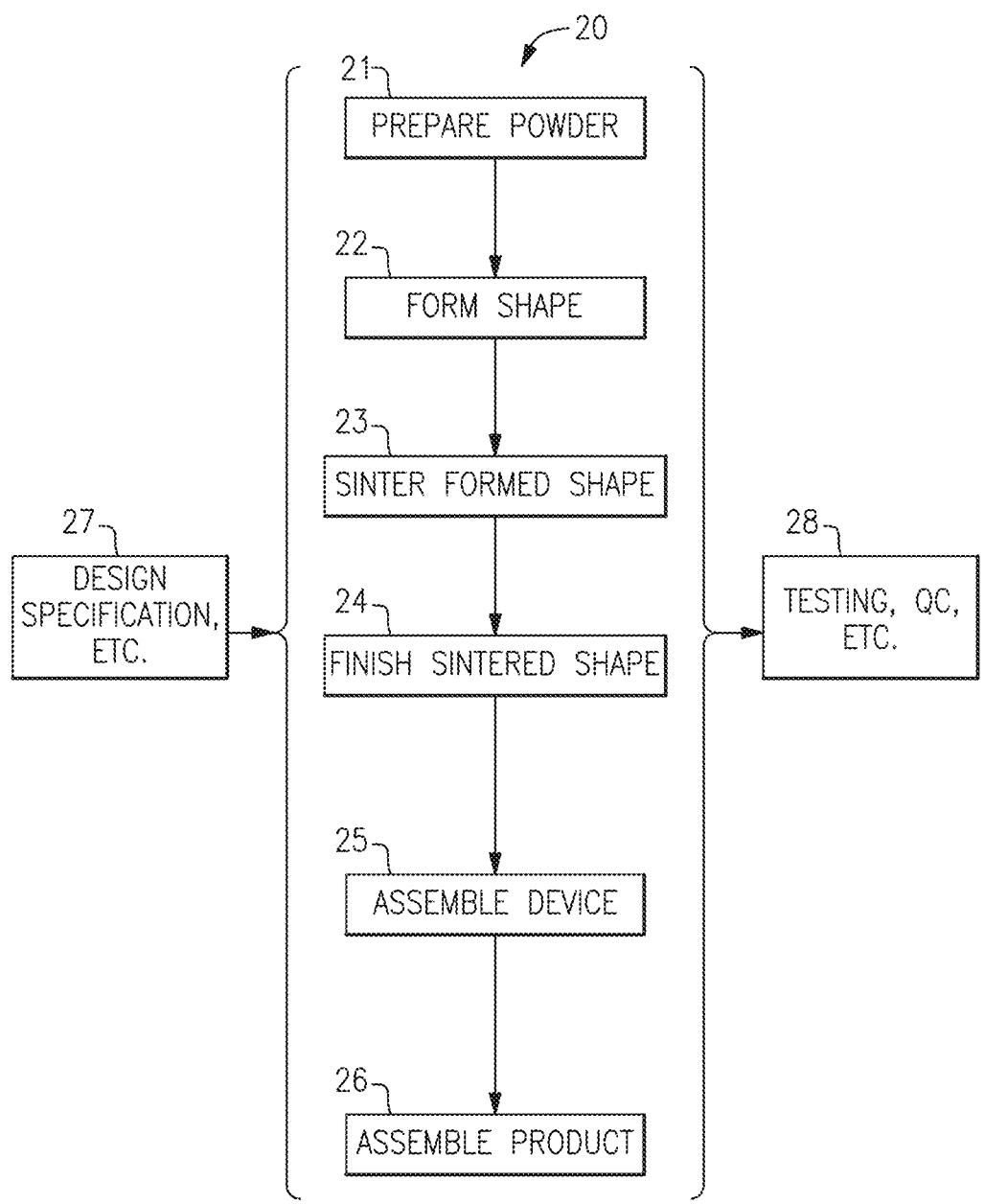
FIG. 10 shows a process that can be implemented to fabricate a ceramic material having one or more features as described herein.

FIGS. 10-14 show examples of how ferrite devices having one or more features as described herein can be fabricated. FIG. 10 shows a process 20 that can be implemented to fabricate a ceramic material having one or more of the foregoing properties. In block 21, powder can be prepared. In block 22, a shaped object can be formed from the prepared powder. In block 23, the formed object can be sintered. In block 24, the sintered object can be finished to yield a finished ceramic object having one or more desirable properties.

In implementations where the finished ceramic object is part of a device, the device can be assembled in block 25. In implementations where the device or the finished ceramic object is part of a product, the product can be assembled in block 26.

FIG. 10 further shows that some or all of the steps of the example process 20 can be based on a design, specification, etc. Similarly, some or all of the steps can include or be subjected to testing, quality control, etc.

In some implementations, the powder preparation step (block 21) of FIG. 10 can be performed by the example process described in reference to FIG. 14. Powder prepared in such a manner can include one or more properties as described herein, and/or facilitate formation of ceramic objects having one or more properties as described herein.

In some implementations, powder prepared as described herein can be formed into different shapes by different forming techniques. By way of examples, FIG. 11 shows a process 50 that can be implemented to press-form a shaped object from a powder material prepared as described herein. In block 52, a shaped die can be filled with a desired amount of the powder. In FIG. 12, configuration 60 shows the shaped die as 61 that defines a volume 62 dimensioned to receive the powder 63 and allow such power to be pressed. In block 53, the powder in the die can be compressed to form a shaped object. Configuration 64 shows the powder in an intermediate compacted form 67 as a piston 65 is pressed (arrow 66) into the volume 62 defined by the die 61. In block 54, pressure can be removed from the die. In block 55, the piston (65) can be removed from the die (61) so as to open the volume (62). Configuration 68 shows the opened volume (62) of the die (61) thereby allowing the formed object 69 to be removed from the die. In block 56, the formed object (69) can be removed from the die (61). In block 57, the formed object can be stored for further processing.

In some implementations, formed objects fabricated as described herein can be sintered to yield desirable physical properties as ceramic devices. FIG. 13 shows a process 70 that can be implemented to sinter such formed objects. In block 71, formed objects can be provided. In block 72, the formed objects can be introduced into a kiln. In FIG. 14, a plurality of formed objects 69 are shown to be loaded into a sintering tray 80. The example tray 80 is shown to define a recess 83 dimensioned to hold the formed objects 69 on a surface 82 so that the upper edge of the tray is higher than the upper portions of the formed objects 69. Such a configuration allows the loaded trays to be stacked during the sintering process. The example tray 80 is further shown to define cutouts 83 at the side walls to allow improved circulation of hot gas at within the recess 83, even when the trays are stacked together. FIG. 14 further shows a stack 84 of a plurality of loaded trays 80. A top cover 85 can be provided so that the objects loaded in the top tray generally experience similar sintering condition as those in lower trays.

In block 73, heat can be applied to the formed objects so as to yield sintered objects. Such application of heat can be achieved by use of a kiln. In block 74, the sintered objects can be removed from the kiln. In FIG. 14, the stack 84 having a plurality of loaded trays is depicted as being introduced into a kiln 87 (stage 86a). Such a stack can be moved through the kiln (stages 86b, 86c) based on a desired time and temperature profile. In stage 86d, the stack 84 is depicted as being removed from the kiln so as to be cooled.

In block 75, the sintered objects can be cooled. Such cooling can be based on a desired time and temperature profile. In block 206, the cooled objects can undergo one or more finishing operations. In block 207, one or more tests can be performed.

Heat treatment of various forms of powder and various forms of shaped objects are described herein as calcining, firing, annealing, and/or sintering. It will be understood that such terms may be used interchangeably in some appropriate situations, in context-specific manners, or some combination thereof.

Telecommunication Base Station

Circuits and devices having one or more features as described herein can be implemented in RF applications such as a wireless base-station. Such a wireless base-station can include one or more antennas configured to facilitate transmission and/or reception of RF signals. Such antenna(s) can be coupled to circuits and devices having one or more circulators/isolators as described herein.

Figure 15:
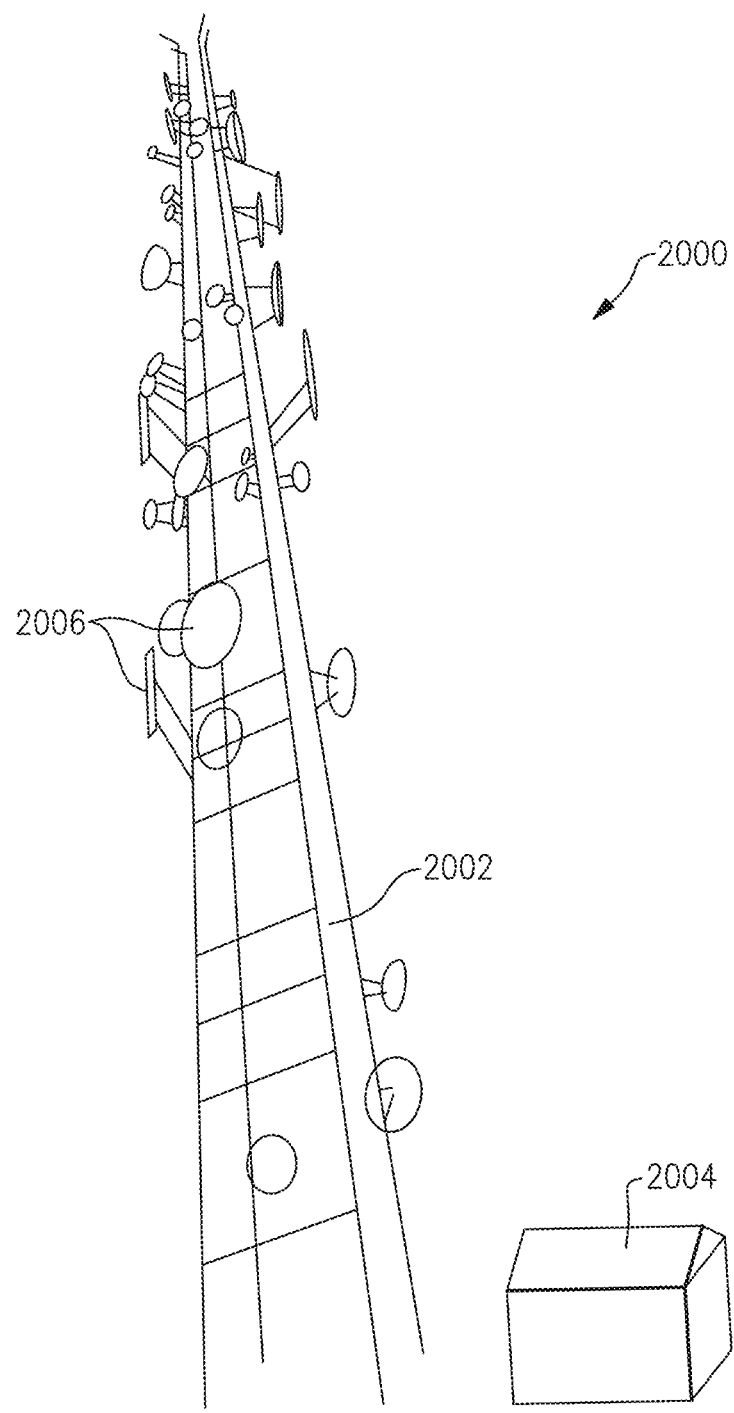
FIG. 15 illustrates a perspective view of a cellular antenna base station incorporating embodiments of the disclosure.

Thus, in some embodiments, the above disclosed material can be incorporated into different components of a telecommunication base station, such as used for cellular networks and wireless communications. An example perspective view of a base station 2000 is shown in FIG. 15, including both a cell tower 2002 and electronics building 2004. The cell tower 2002 can include a number of antennas 2006, typically facing different directions for optimizing service, which can be used to both receive and transmit cellular signals while the electronics building 2004 can hold electronic components such as filters, amplifiers, etc. discussed below. Both the antennas 2006 and electronic components can incorporate embodiments of the disclosed ceramic materials.

FIG. 12 shows a schematic view of a base station such as shown in FIG. 15. As shown, the base station can include an antenna 412 that is configured to facilitate transmission and/or reception of RF signals. Such signals can be generated by and/or processed by a transceiver 414. For transmission, the transceiver 414 can generate a transmit signal that is amplified by a power amplifier (PA) and filtered (Tx Filter) for transmission by the antenna 412. For reception, a signal received from the antenna 412 can be filtered (Rx Filter) and amplified by a low-noise amplifier (LNA) before being passed on to the transceiver 414. In the example context of such Tx and Rx paths, circulators and/or isolators 400 having one or more features as described herein can be implemented at or in connection with, for example, the PA circuit and the LNA circuit. The circulators and isolators can include embodiments of the material disclosed herein. Further, the antennas can include the materials disclosed herein, allowing them to work on higher frequency ranges.

Figure 16:
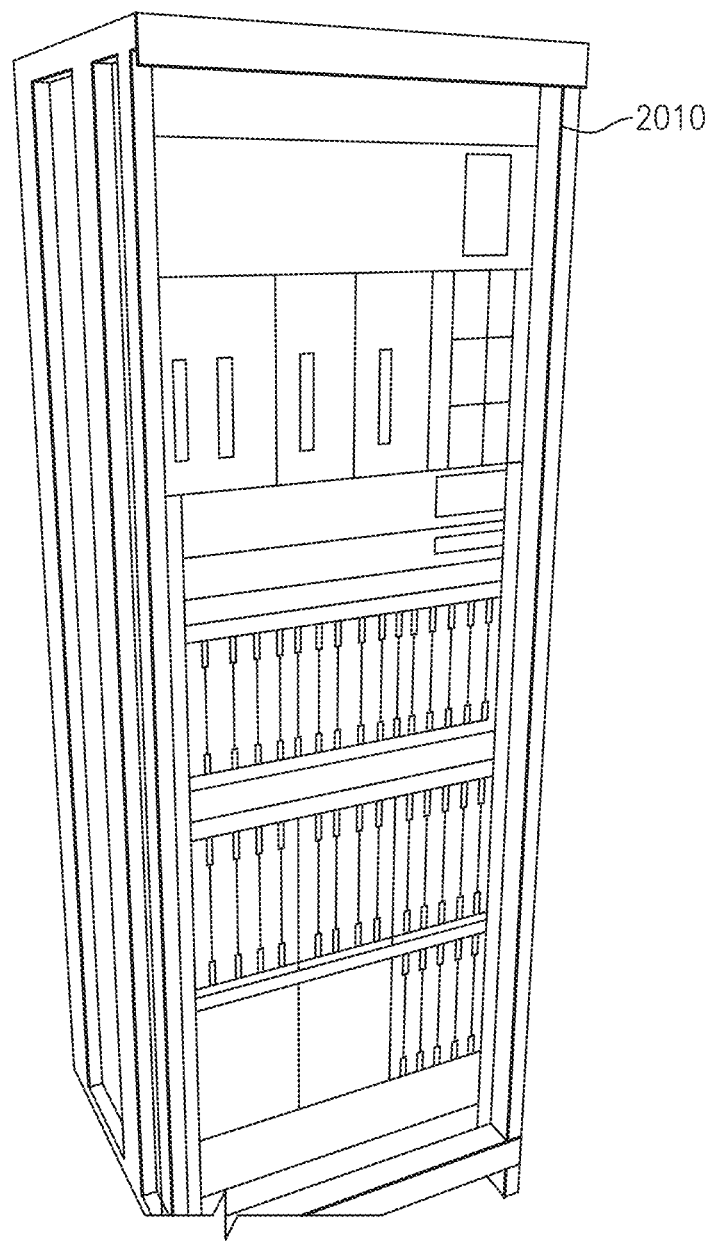
FIG. 16 illustrates housing components of a base station incorporating embodiments of the disclosed material.

FIG. 16 illustrates hardware 2010 that can be used in the electronics building 2004, and can include the components discussed above with respect to FIG. 12. For example, the hardware 2010 can be a base station subsystem (BSS), which can handle traffic and signaling for the mobile systems.

Figure 17:
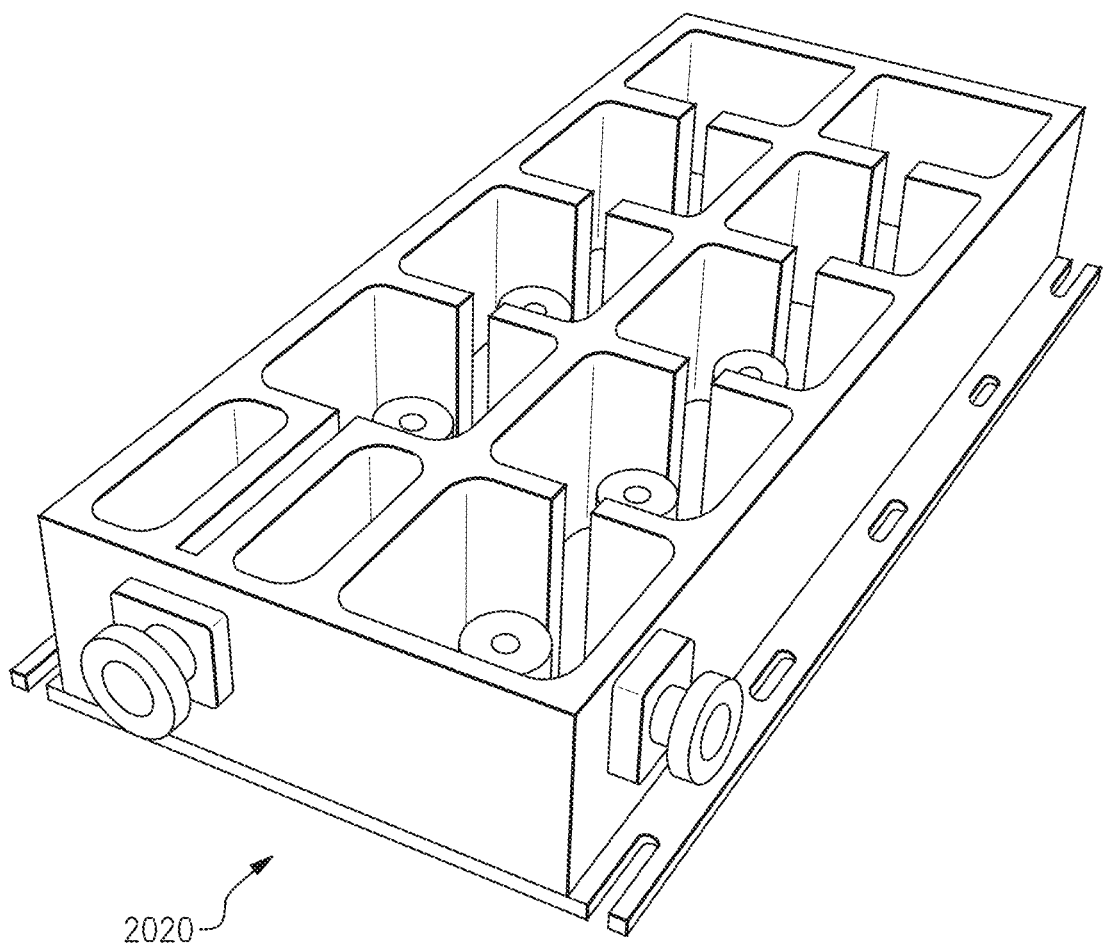
FIG. 17 illustrates a cavity filter used in a base station incorporating embodiments of the material disclosed herein.

FIG. 17 illustrates a further detailing of the hardware 2010 discussed above. Specifically, FIG. 17 depicts a cavity filter/combiner 2020 which can be incorporated into the base station. The cavity filter 2020 can include, for example, bandpass filters such as those incorporating embodiments of the disclosed material, and can allow the output of two or more transmitters on different frequencies to be combined.

Additionally, embodiments of the disclosure can be general temperature insensitive at operation temperatures (temperature insensitive isolators and circulators) due to the high Curie temperatures discussed above. Accordingly, embodiments of the disclosure can be high temperature isolators and circulators, which can be used in high temperature base stations such as those discussed herein.

From the foregoing description, it will be appreciated that an inventive garnets and method of manufacturing are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A packaged radio frequency device comprising a housing and a ceramic material with low temperature sensitivity enclosed by the housing, the ceramic material including a composition of (Y or Gd)$_{3-x-2y}$Bi$_x$Ca$_{2y}$Fe$_{5-z-y}$In$_z$V$_y$O$_{12}$, 0<x<1.75, 0<y<0.8, and 0<z<0.7.

2. The packaged radio frequency device of claim 1 wherein the packaged radio frequency device is a circulator.

3. The packaged radio frequency device of claim 1 wherein 1.4<x<1.6.

4. The packaged radio frequency device of claim 1 wherein 0.2<z<0.7.

5. The packaged radio frequency device of claim 1 wherein the ceramic material has a composition including Bi$_{1.4}$Y$_{0.66}$Ca$_{0.94}$In$_{0.4}$V$_{0.47}$Fe$_{4.13}$O$_{12}$.

6. The packaged radio frequency device of claim 1 wherein the ceramic material has a composition including Bi$_{1.4}$Y$_{0.62}$Ca$_{0.98}$In$_{0.4}$V$_{0.49}$Fe$_{4.11}$O$_{12}$.

7. The packaged radio frequency device of claim 1 wherein the ceramic material has a composition including Bi$_{1.4}$Y$_{0.58}$Ca$_{1.02}$In$_{0.4}$V$_{0.51}$Fe$_{4.09}$O$_{12}$.

8. The packaged radio frequency device of claim 1 wherein the ceramic material has a composition including Bi$_{1.4}$Y$_{0.54}$Ca$_{1.06}$In$_{0.4}$V$_{0.53}$Fe$_{4.07}$O$_{12}$.

9. The packaged radio frequency device of claim 1 wherein the ceramic material has a composition including Bi$_{1.4}$Y$_{0.50}$Ca$_{1.11}$In$_{0.4}$V$_{0.55}$Fe$_{4.05}$O$_{12}$.

10. The packaged radio frequency device of claim 1 wherein the ceramic material has a composition including Bi$_{1.4}$Y$_{0.46}$Ca$_{1.14}$In$_{0.4}$V$_{0.57}$Fe$_{4.03}$O$_{12}$.

11. The packaged radio frequency device of claim 1 wherein the ceramic material has a composition including Bi$_{1.4}$Y$_{0.42}$Ca$_{1.18}$In$_{0.4}$V$_{0.59}$Fe$_{4.01}$O$_{12}$.

12. The packaged radio frequency device of claim 1 wherein the ceramic material has a composition including Bi$_{1.4}$Y$_{0.38}$Ca$_{1.22}$In$_{0.4}$V$_{0.61}$Fe$_{3.99}$O$_{12}$.

13. The packaged radio frequency device of claim 1 wherein the ceramic material has a composition including Bi$_{1.4}$Y$_{0.34}$Ca$_{1.26}$In$_{0.4}$V$_{0.63}$Fe$_{3.97}$O$_{12}$.

14. A packaged radio frequency device comprising a housing and a ceramic material with low temperature sensitivity enclosed by the housing, the ceramic material including a composition of (Y or Gd)$_{3-x-2y}$Bi$_x$Ca$_{2y+a}$Fe$_{5-z-y-a}$In$_z$V$_y$Zr$_a$O$_{12}$, 0<x<1.75, 0<y<0.8, and 0<z+a<0.7.

15. The packaged radio frequency device of claim 14 wherein the packaged radio frequency device is a circulator.

16. The packaged radio frequency device of claim 14 wherein 1.4<x<1.6.

17. The packaged radio frequency device of claim 14 wherein 0.2<z+a<0.7.

18. The packaged radio frequency device of claim 14 wherein 0.2<z.

19. The packaged radio frequency device of claim 14 wherein 0.2<a.

* * * * *